(12) United States Patent
Demonfort et al.

(10) Patent No.: US 11,919,659 B2
(45) Date of Patent: Mar. 5, 2024

(54) ASSEMBLY COMPRISING A LAUNCH MOTOR VEHICLE AND A JET-POWERED DRONE AIRCRAFT, AND METHOD FOR TRANSPORTING AND RELEASING A LOAD

(71) Applicant: DAE, Ciboure (FR)

(72) Inventors: Thierry Demonfort, Ciboure (FR); Christophe Micoli, Marseilles (FR)

(73) Assignee: DAE, Ciboure (FR)

( * ) Notice: Subject to any disclaimer, the term of this patent is extended or adjusted under 35 U.S.C. 154(b) by 0 days.

(21) Appl. No.: 17/620,366

(22) PCT Filed: Jun. 18, 2020

(86) PCT No.: PCT/EP2020/066999
§ 371 (c)(1),
(2) Date: Dec. 17, 2021

(87) PCT Pub. No.: WO2020/254512
PCT Pub. Date: Dec. 24, 2020

(65) Prior Publication Data
US 2022/0234755 A1 Jul. 28, 2022

(30) Foreign Application Priority Data

Jun. 18, 2019 (FR) .................................... 1906516

(51) Int. Cl.
*B64F 1/06* (2006.01)
*B64C 39/02* (2023.01)
(Continued)

(52) U.S. Cl.
CPC .............. *B64F 1/06* (2013.01); *B64C 39/024* (2013.01); *B64D 1/08* (2013.01); *B64D 17/80* (2013.01);
(Continued)

(58) Field of Classification Search
CPC . B64F 1/04; B64F 1/06; B64C 39/024; B64C 2201/084; B64C 2201/128; B64C 2201/125
See application file for complete search history.

(56) References Cited

U.S. PATENT DOCUMENTS

| 1,803,320 A | * | 5/1931 | Christianson | ............. | B64F 1/10 |
| | | | | | 414/537 |
| 2,856,139 A | * | 10/1958 | Lockwood | ................ | B64F 1/06 |
| | | | | | 92/92 |

(Continued)

FOREIGN PATENT DOCUMENTS

| EP | 3233632 A1 | 10/2017 |
| GB | 2132577 A | 7/1984 |

OTHER PUBLICATIONS

STRATASYS Aerospace YouTube video "Watch World's First Jet-Powered, 3D Printed UAV Top 150 Mph!" https://www.youtube.com/watch?v=8e--5u2LpHU&t=185s Nov. 9, 2015 (Year: 2015).*

(Continued)

*Primary Examiner* — Benjamin P Lee
(74) *Attorney, Agent, or Firm* — Chiesa Shahinian & Giantomasi PC

(57) ABSTRACT

The invention relates to an assembly (10) comprising a launch motor vehicle (12) and a drone (14), the launch motor vehicle (12) being capable of travelling on a launch track to exceed a given speed threshold relative to a surrounding air mass, the launch motor vehicle (12) being provided with a launch ramp (20) cooperating with the drone (14) to, in a launching position, guide the drone (14) from a starting position in a launch direction to the front of the launch motor vehicle (12). The drone (14) comprises one or more reactors (30) and does not comprise a landing gear.

15 Claims, 15 Drawing Sheets

(51) Int. Cl.
    *B64D 1/08*           (2006.01)
    *B64D 17/80*         (2006.01)
    *B64U 10/25*           (2023.01)
    *B64U 50/12*           (2023.01)
    *B64U 70/70*           (2023.01)
    *B64U 70/83*           (2023.01)
    *B64U 80/86*           (2023.01)
    *B64U 101/60*         (2023.01)

(52) U.S. Cl.
    CPC .............. *B64U 10/25* (2023.01); *B64U 50/12* (2023.01); *B64U 70/70* (2023.01); *B64U 70/83* (2023.01); *B64U 80/86* (2023.01); *B64U 2101/60* (2023.01)

(56) References Cited

U.S. PATENT DOCUMENTS

| | | | | |
|---|---|---|---|---|
| 4,079,901 A * | 3/1978 | Mayhew | ................... | B64F 1/06 124/36 |
| 4,238,093 A * | 12/1980 | Siegel | ................... | B64F 1/06 244/63 |
| 4,678,143 A * | 7/1987 | Griffin | ................... | B64F 1/06 244/63 |
| 4,909,458 A * | 3/1990 | Martin | ................... | B64F 1/06 254/387 |
| 6,457,673 B1 * | 10/2002 | Miller | ................... | B64F 1/06 244/63 |
| 6,851,647 B1 * | 2/2005 | Rosenbaum | ............. | B64F 1/06 244/63 |
| 7,140,575 B2 * | 11/2006 | McGeer | ................... | B64F 1/04 244/63 |
| 7,210,654 B1 * | 5/2007 | Cox | ................... | F42B 12/365 244/190 |
| 7,665,691 B2 * | 2/2010 | Hanzlick | ................... | B64F 1/10 244/63 |
| 8,894,006 B2 * | 11/2014 | Jones | ................... | B64F 1/06 244/63 |
| 10,118,713 B2 * | 11/2018 | Tully | ................... | B64F 1/08 |
| 2008/0149758 A1 * | 6/2008 | Colgren | ................ | B64C 39/024 244/45 R |
| 2008/0203220 A1 * | 8/2008 | Hanzlick | ................... | B64F 1/10 244/63 |
| 2014/0061377 A1 * | 3/2014 | Smith | ................... | B64F 1/0297 244/63 |
| 2015/0060600 A1 * | 3/2015 | Tully | ................... | B64F 1/08 244/63 |
| 2016/0347477 A1 * | 12/2016 | Tully | ................... | B64F 1/08 |
| 2019/0047726 A1 | 2/2019 | Carthew et al. | | |

OTHER PUBLICATIONS

International Search Report and Written Opinion dated Sep. 17, 2020 in corresponding International Application No. PCT/EP2020/066999 and the English Translation of the International Search Report.

Decision to Grant dated Apr. 29, 2022, in connection with European Patent Application No. 20734342.7, 2 pgs. (including translation).

Communication pursuant to Article 94(3) EPC dated Nov. 19, 2021, in connection with European Patent Application No. 20734342.7, 9 pgs. (including translation).

Communication pursuant to Rule 71(3) EPC dated Mar. 22, 2022, in connection with European Patent Application No. 20734342.7, 15 pgs. (including translation).

* cited by examiner

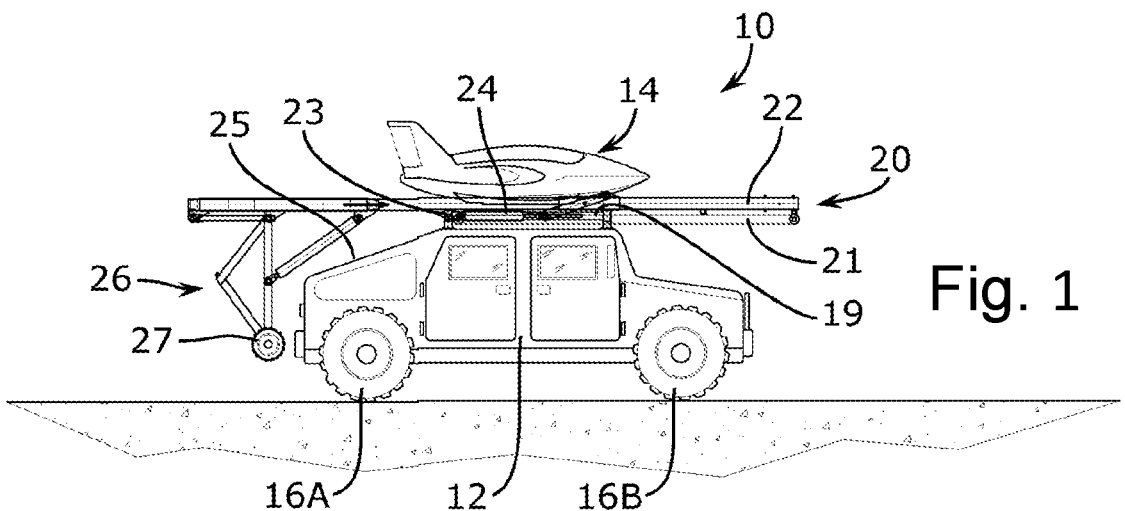
Fig. 1
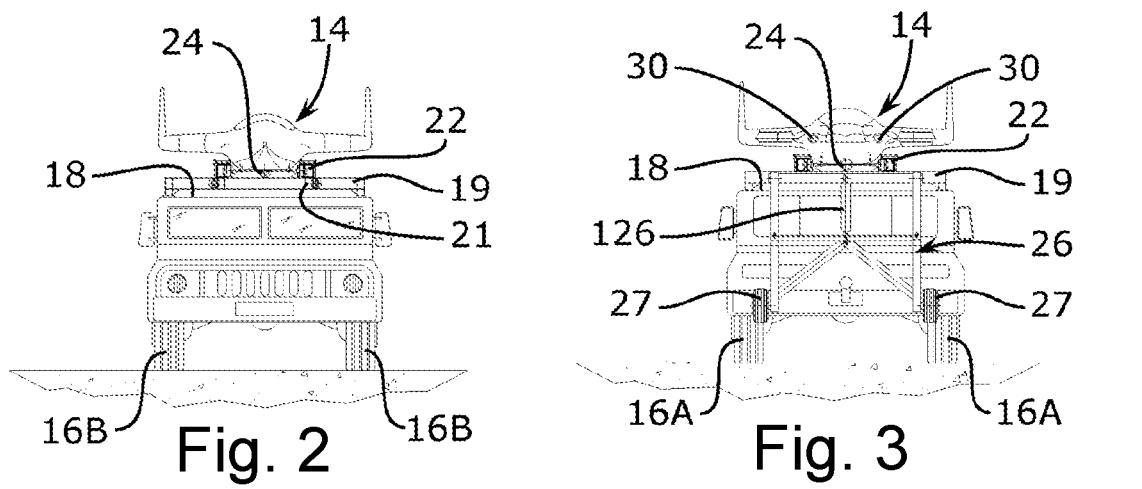
Fig. 2
Fig. 3
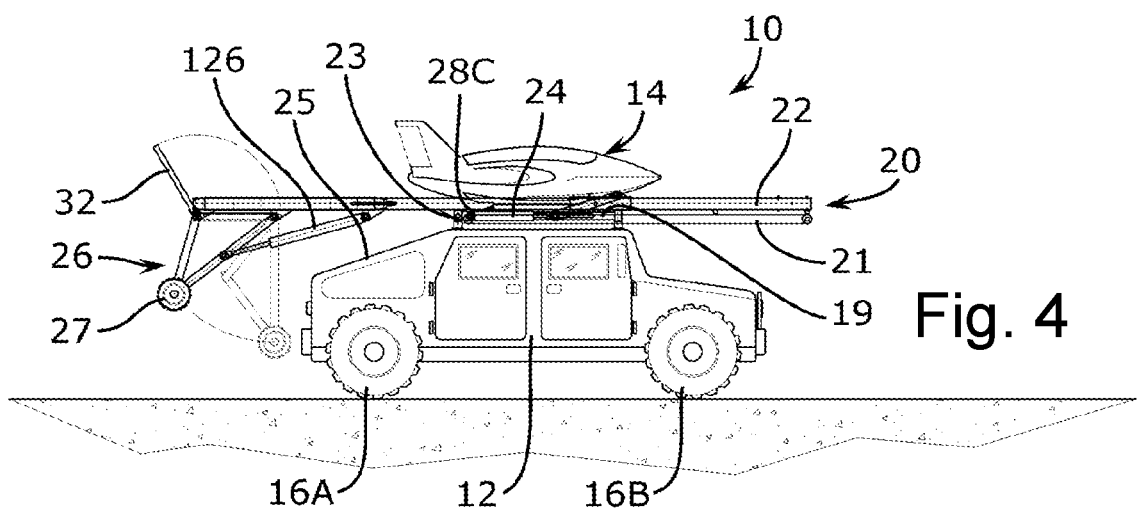
Fig. 4

ASSEMBLY COMPRISING A LAUNCH MOTOR VEHICLE AND A JET-POWERED DRONE AIRCRAFT, AND METHOD FOR TRANSPORTING AND RELEASING A LOAD

CROSS-REFERENCE TO RELATED APPLICATIONS

This application is the National Stage entry under 35 U.S.C. § 371 of International Application No. PCT/EP2020/066999, filed Jun. 18, 2020, published on Dec. 24, 2020 under Publication Number WO 2020/254512 A1, which claims the benefit of priority under 35 U.S.C. § 119 of French Patent Application Number FR1906516, filed Jun. 18, 2019, the entireties of which are herein incorporated by reference.

TECHNICAL FIELD OF THE INVENTION

The invention relates to the launching of a drone. It also refers to the delivery of a load by air to a drop zone.

PRIOR ART

Solutions for launching drones from stationary or moving ground vehicles are known. The drones in question are generally of small wingspan and low mass, and propelled by propellers that do not allow for high thrust at takeoff and high speeds in the later phases of flight, as illustrated for example in U.S. Pat. No. 7,665,691 B2 or US 2019/047726 A1. The known means do not allow us to consider the takeoff of drones of greater mass and scale.

They also do not optimize the drone and its launcher in a way that minimizes the energy consumption of the drone during takeoff and during the later phases of flight, with the aim of maximizing the range or speed of intervention.

DISCLOSURE OF THE INVENTION

The invention aims to remedy the disadvantages of the state of the art and to propose means of launching a drone with a large wingspan and/or high mass from the ground, with the aim of carrying out a mission, in particular of reconnaissance or of dropping a load, the load being able to comprise, in particular, rescue equipment, foodstuffs, ammunition, means of transmission, weapons or a machine, rapidly and at a distance from the launch zone.

For this purpose, an assembly is proposed comprising a launch vehicle and a drone, the motorized launch vehicle being capable of rolling on a launch track to exceed a given speed threshold with respect to a surrounding air mass, the motorized launch vehicle being provided with a launch ramp cooperating with the drone to, in a launch position, guide the drone in translational motion from a starting position in a direction of launch towards the front of the motorized launch vehicle, the drone comprising one or more jet engines and not comprising a landing gear.

The term "engine" is used here to mean a jet engine, in particular a turbojet engine. The propulsion of the drone by one or more engines allows the transport of a large payload, with a high speed of intervention, with a large range.

The ability to launch from the moving motor vehicle contributes to the limitation of the energy to be expended by the drone in the takeoff phase, which also contributes to an increase in payload and range. The motor vehicle also allows the assembly to be moved to an optimal area for launching. For a rescue mission at sea, for example, the motor vehicle can be brought to a point on the coast that is favorable, in terms of wind conditions, in order to reach the target drop zone in the shortest possible time.

The absence of landing gear, meanwhile, allows for a reduction in the empty weight and volume of the drone and a significant reduction in drag, which also contributes to an increase in payload and range. In addition, the absence of landing gear allows for mechanical simplification which limits the risk of failure.

The motor vehicle is preferably an all-terrain vehicle, a military vehicle or a special vehicle, with the ramp being positioned on the roof of the vehicle or on a platform provided for this purpose. An all-terrain vehicle facilitates, if necessary, a launch from an unprepared runway, for example, from a beach in the case of a rescue at sea.

Preferably, an active suspension is arranged between a chassis and wheel sets of the motor vehicle, or between the launch ramp and the chassis of the motor vehicle, or between a carriage and a rail of the launch ramp, to stabilize the drone.

In one embodiment, the drone has a fuselage and a canopy, the canopy preferably with a span greater than a track width of the launch vehicle. More generally, the drone can have a wingspan of more than 2 meters, and preferably more than 2.5 meters, or even more than 3 meters. If necessary, the drone can have a variable geometry, for example with folding wings, so that the width of the wing for transport is narrower than for launch and flight.

According to an embodiment, the assembly further comprises at least one locking mechanism, movable between a locking position for securing the drone relative to the launch ramp in a cocked position, and an unlocking position allowing movement of the drone relative to the launch ramp. In particular, the hooking device could foreseeably be provided with a trigger, preferably mechanical, electromechanical or pyrotechnical, preferably piloted so as not to be triggered as long as a predetermined condition is not fulfilled, the predetermined condition being one of the following conditions, or a combination of several conditions among the following conditions:

- the drone's engine(s) deliver a thrust above a given threshold;
- a force exerted by the drone on the attachment device is lower than a given threshold;
- the motor vehicle has reached or exceeded the given speed threshold in relation to the surrounding air mass;
- the motor vehicle has reached or exceeded a given speed threshold;
- the launch ramp has a given inclination or angular area in
- the launch ramp has a given inclination or in a given angular area with respect to the vehicle's attitude.
- one or more heat shields or deflectors are in a functional position;
- a retractable force recovery roller at the rear of the vehicle is in functional position.

According to an embodiment, the motor launch vehicle is provided with a deflector capable, in an operational position, of deflecting a jet of air expelled by the drone's jet engine(s), the deflector preferably being movable between the operational position and a transport position to reduce the drag of the launch vehicle in the air, the deflector in the operational position deflecting the jet of air, preferably upwards. The deflector prevents a second vehicle, which would follow the vehicle that has just made the release, from being impacted. One can thus envisage a column of vehicles following each other at a short distance and dropping their drone one after the other before leaving the column.

If necessary, a front deflector may also be provided, projecting forward from the platform so as to protect the vehicle windshield.

The drone in the starting position preferably has a center of gravity whose vertical projection, when the vehicle is travelling in a straight line on a horizontal launch track, is located in a rectangle delimited by the contact zones between the wheels of the motor vehicle and the launch track, closer to a median transverse vertical plane between a front wheelset and a rear wheelset of the vehicle than to the front wheelset or the rear wheelset.

In one embodiment, the launch ramp is movable between the launch position and a transport position to reduce the drag of the launch vehicle in the air. Advantageously, the launch ramp is positioned on a roof of the launch vehicle, which preferably has an inclined rear cover allowing a rear cantilevered portion of the launch ramp to be lowered when the launch ramp moves from the transport position to the launch position. Preferably, moving from the transport position to the launch position results in a tilt of the launch ramp and/or an extension of the launch ramp. If necessary, the ramp can be motorized to ensure the passage from one position to another. It can be foreseen that the passage is only possible at a standstill. It can also be foreseen that it is possible when the motor vehicle is in motion.

The absence of a landing gear allows, compared to a drone with a fixed landing gear, a significant reduction in the drag of the drone, and, compared to a drone with a retractable landing gear, a considerable technical simplification, which is accompanied by greater reliability and a significant reduction in unladen weight. The absence of a landing gear also makes it possible to authorize drone launches from rough terrain and to avoid the need for landing and takeoff airstrips.

In one embodiment, the drone is provided with skids for sliding on the launch ramp, especially on rails or in runners on the launch ramp. The fixed and profiled skids generate a low and easily controllable drag. They are used to interface with the ramp during launch and as feet when the drone is on the ground. The skids are preferably constituted by ribs protruding slightly from the belly of the drone's fuselage, over all or part of the length of the fuselage. These ribs extend parallel to the longitudinal axis of the drone, and can be located on two planes parallel to a median longitudinal plane of the fuselage or on two planes at an angle to the median longitudinal plane of the fuselage. There are preferably two skids.

In another embodiment, a mobile assembly is guided all the way along the launch ramp, and means are provided for securing the drone to the mobile assembly until the drone reaches a takeoff position relative to the launch ramp, and releasing the drone from the mobile assembly when the drone reaches the takeoff position. The mobile assembly remains attached to the launch ramp after the drone takes off.

In one embodiment, the drone is equipped with a recovery parachute. The recovery parachute, preferably housed in a cavity in the drone, is deployed for the recovery of the drone, for example to recondition it for a new mission.

The drone has a fuselage and a wing. The fuselage is preferably provided with a cavity to accommodate a load. The cavity is preferably open on the back of the fuselage, i.e. on a side of the fuselage opposite to the ground at least in the launch and flight phases. The opening can, if necessary, be closed by a cover that can be released or ejected. It is also possible to provide a device for closing the cavity after the release of the load, to minimize turbulence during the drone return and recovery phase. This shutting device is preferably a lightweight device, such as a roller shutter or, preferably, an inflatable sack that can be quickly deployed and occupies all or part of the cavity by sealing the opening.

An additional simplification is achieved if the drone is equipped with avionics on the back allowing a stabilized flight, for a load release phase of the load lodged in the cavity of the fuselage of the drone. This avoids the need for a trap door system, which contributes to the simplicity, lightness and reliability of the system.

Preferably, the jet engine(s) will have sufficient thrust to ensure takeoff of the drone when the motor vehicle has reached or exceeded the required speed. Alternatively, the launch ramp can be equipped with an energy accumulator capable of impulsively releasing previously accumulated energy to catapult the drone. The energy accumulator can be scaled to allow for takeoff, in combination with the maximum thrust of the engines and the speed of the vehicle. It can also be scaled to allow for takeoff in combination with maximum engine thrust with the vehicle at rest.

According to one embodiment, the energy accumulator comprises one or more pneumatic energy accumulators, constituted by pressurized gas reservoirs, in particular compressed air, whose expansion in free air or in a variable-volume chamber of a pneumatic jack generates mechanical work for catapulting the drone.

Preferably, the energy accumulator(s) are integrated with an actuator that can modulate in real time the output flow of the energy accumulator(s), and thus the kinetic energy transferred to the drone, during the launch phase. In particular, the modulation law can impose that the instantaneous thrust on the drone remains below a given threshold, at any time during the launch phase.

According to another aspect of the invention, it relates to a method of transporting and dropping a load, comprising a launch of a drone carrying the load, then a flight of the drone to a drop zone, followed by a drop of the load from the drone in flight, then a flight of the drone to a recovery zone, preferably implemented by the assembly as previously defined. For the launch, a launch vehicle carrying the drone rolls on a launch track so as to exceed a given speed threshold with respect to a surrounding air mass, and the drone is guided by a launch ramp equipped with the launch vehicle from a starting position in a launch direction towards the front of the launch vehicle; the drone is propelled during the launch and at least part of the flight towards the drop zone and/or the flight to the recovery zone at least partially by one or more of the drone's engines, and the drone, having reached the recovery zone, deploys a recovery parachute and lands on the recovery area without a landing gear.

The piloting of the drone in the takeoff phase can be done from the vehicle, in a pre-programmed way with dedicated avionics equipment, or independently by a remote operator.

Preferably, the release of the load involves flipping the drone onto its back, then, by gravity, a release of the load from a cavity in the drone flying on its back, then, preferably, a deployment of a parachute to slow down the load in free fall.

BRIEF DESCRIPTION OF THE FIGURES

Further features and advantages of the invention will become apparent from the following description, with reference to the attached figures, which illustrate:

FIG. 1, a side view of an assembly according to a first embodiment of the invention, comprising a motor vehicle and a drone, in a transport position;

FIG. 2, a front view of the assembly in FIG. 1, in the transport position;

FIG. 3, a rear view of the assembly in FIG. 1, in the transport position;

FIG. 4, a side view of the assembly in FIG. 1, in a first phase of deployment of a drone launch ramp;

For the sake of clarity, identical or similar elements are marked with identical reference signs throughout the figures.

DETAILED DESCRIPTION OF EMBODIMENTS

Figure 5:
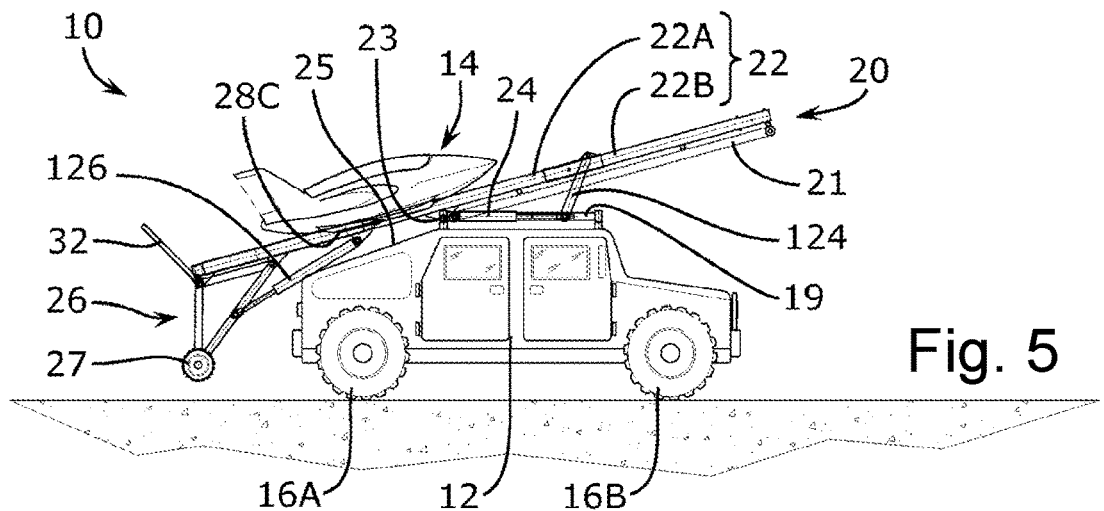
FIG. 5, a side view of the assembly in FIG. 1, in a second phase of deployment of the drone launch ramp.

FIGS. 1 to 3 illustrate an assembly 10 comprising a launch vehicle 12 and a drone 14. The motor vehicle 12 is able to travel at high speed on prepared or paved tracks, and preferably also on unprepared and unpaved tracks. The motor vehicle 12 shown here is a four-wheeled light-duty all-terrain utility vehicle 16A, 16B, but a motor vehicle of another type is also useable.

The motor vehicle 12 is equipped, on its roof 18, with a fixed frame 19 supporting a launch ramp 20 to which the drone 14 is coupled. The launch ramp 20 here constitutes in particular a mobile frame 21 supporting two parallel rails 22 to guide the drone 14 on a rectilinear launch trajectory.

Figure 6:
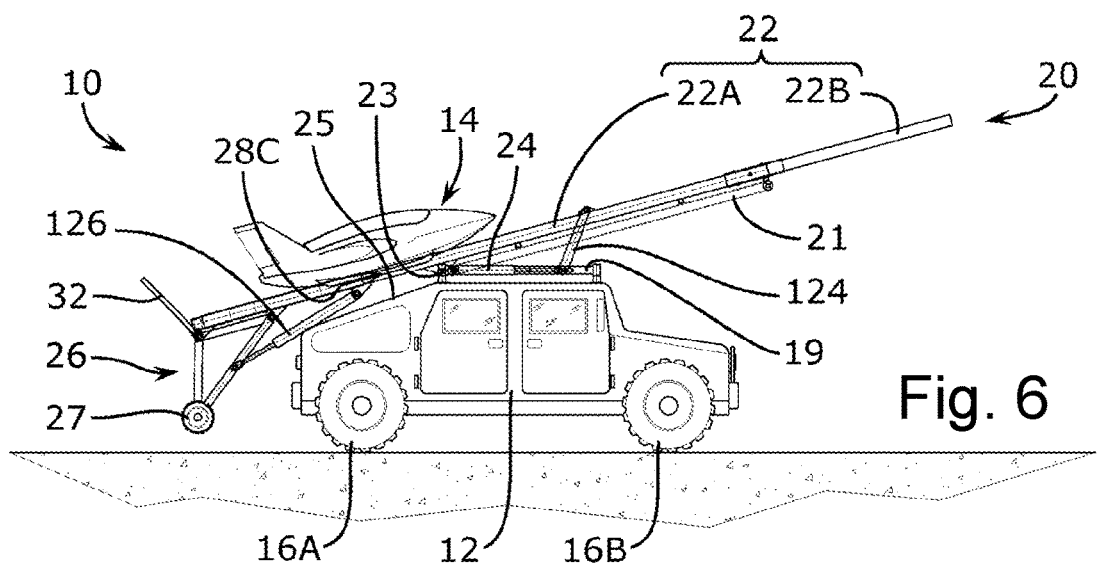
FIG. 6, a side view of the assembly in FIG. 1, in a third phase of deployment of the drone launch ramp.
Figure 7:
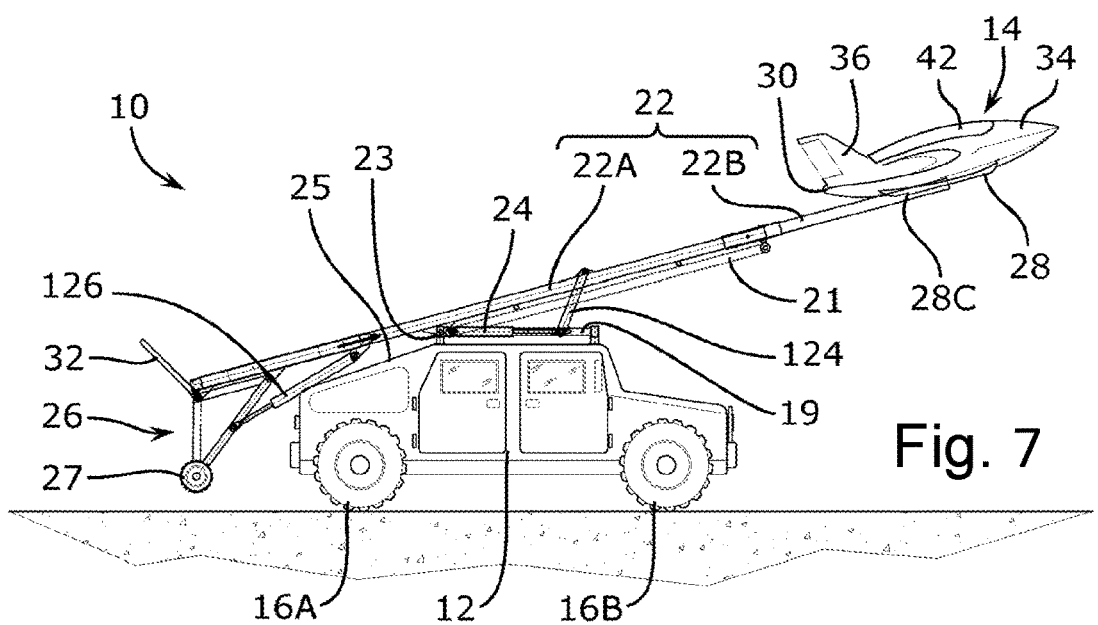
FIG. 7, the assembly in FIG. 1, in a drone launch phase.

The launch ramp 20 is preferably mobile relative to the fixed frame 19 between a transport position, shown in FIG. 1, and a launch position shown in FIGS. 6 and 7, passing through various deployment phases, shown in FIGS. 4 through 6. In practice, the mobile frame 21 of the launch ramp is hinged to the fixed frames 19 mounted on the roof 18 of the motor vehicle 12 via a hinge 23, to pivot about a horizontal transverse pivot axis. In the launch position (and preferably in the transport position), the drone 14 points toward the front of the motor vehicle 12. In the transport position, the launch ramp 20 is positioned horizontally, to reduce the drag coefficient of the motor vehicle 12 in the air.

The transition from the transport position to the launch position is carried out by pivoting the launch ramp 20 about the horizontal transverse pivot axis defined by the hinge 23, using a hydraulic, pneumatic or electromechanical cylinder 24.

The actuator 24 can be placed directly between the fixed frame 19 and the launch ramp 20. Alternatively, we can predict, as shown in FIGS. 5 to 7, an actuator 24 attached to the fixed frame 19 and driving a mechanism 124 for transmitting motion from the actuator 24 to the launch ramp 20, which ensures that in the launch position, forces applied to the launch ramp 20 are only transmitted to the actuator 24. We can for example predict a connecting rod 124 may be provided, one end of which is articulated to a rod of the actuator 24 and is guided in translation parallel to the horizontal axis of the rod of the actuator 24, and the other end of which is articulated to the mobile frame 19 or to a crosspiece connecting the two rails 22 of the launch ramp 20. The angle between the connecting rod 124 and the actuator 24 has been represented as an obtuse angle in FIGS. 5 to 7, but may optionally be a right angle, to further reduce or even cancel the forces on the launch ramp 20 through to the actuator 24 in the launch position, or even an acute angle, which allows, by providing an end-of-travel stop for the rod of the actuator 24, the forces exerted by the ramp 20 on the connecting rod 124 at the end-of-travel stop to be fully taken up.

The pivot axis of the joint 23 is preferably located within the lift rectangle of the motor vehicle 12, i.e., between the rear wheel assembly 16A and the front wheel assembly 16B of the motor vehicle, and at a distance from the longitudinal ends of the launch ramp 20, so that when the launch ramp 20 tilts, a rear end of the launch ramp 20 lowers while a front end of the launch ramp 20 raises. Advantageously, the motor vehicle 12 may have a sloped rear hood 25 that allows the cantilevered rear end of the launch ramp 20 to lower as the ramp moves from the transport position to the launch position.

The launch ramp 20 may optionally be equipped with a retractable undercarriage 26, hinged near the rear end of the launch ramp 20 and driven by an actuator 126, to move from a retracted position shown in FIG. 1 to a deployed position shown in FIG. 4. The retractable undercarriage 26 has at least one, and preferably two, wheels 27 which, in the inclined position of the ramp 20 shown in FIGS. 5 to 7, can be positioned at a short distance from the ground, or, according to a variant not shown, can roll on the ground.

Figure 8:
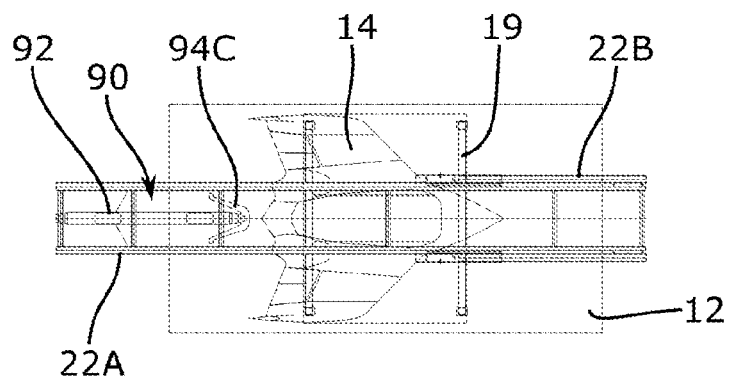
FIG. 8, a bottom view of the launch ramp and the drone in the position in FIG. 4.
Figure 9:
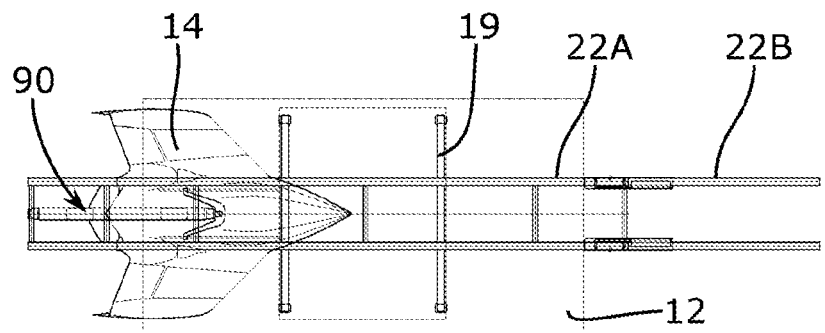
FIG. 9, a view from below of the launch ramp and the drone, in the position in FIG. 6.
Figure 10:
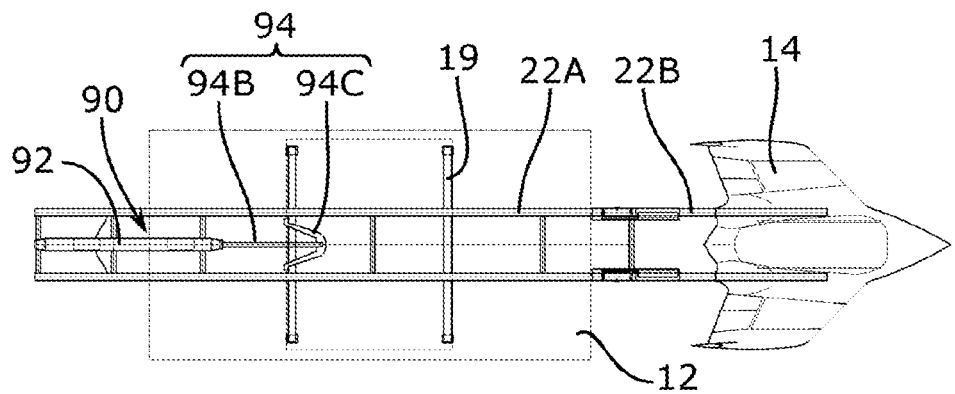
FIG. 10, a bottom view of the launch ramp and the drone in the position shown in FIG. 7.

As illustrated in detail in FIGS. 8 to 10, the rails 22 of the launch ramp 20 are preferably in at least two parts 22A, 22B movable relative to each other, so as to permit extension of the front part of the launch ramp 20 in the launch position (FIGS. 6, 7, 9 and 10) and retraction in the transport position (FIGS. 1 and 8).

Preferably, the rear portion 22A of the rails is fixed with respect to the movable frame 21, or forms one unit with the movable frame 21, so as to pivot about the axis of the joint 23, and connected to the actuator 24, for example via the connecting rod 124, as illustrated in FIGS. 5 to 7. A front part 22B of the rails is movable with respect to the rear part 22A so as to be retracted in transport position and deployed in launching position.

Figure 11:
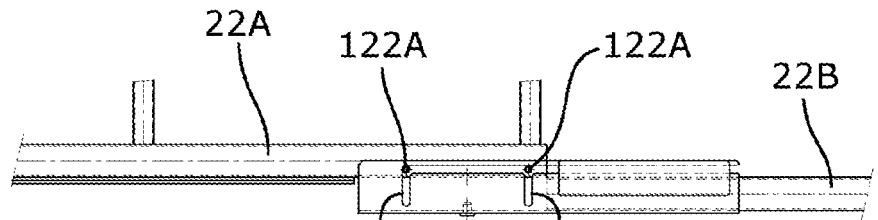
FIG. 11, a detail view of two portions of a rail of the launch ramp with the launch ramp at maximum extension, before reaching the position in FIG. 9.
Figure 12:
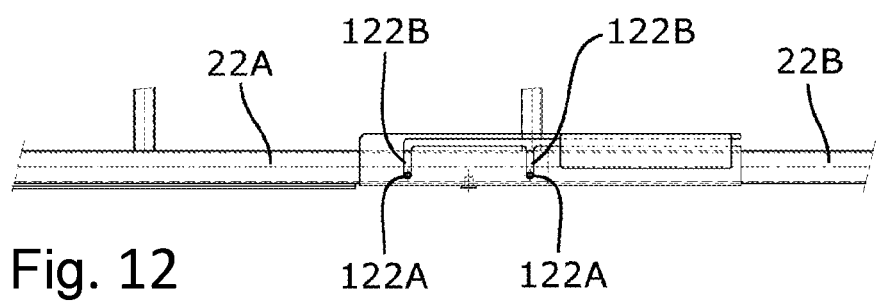
FIG. 12, a detail view of the two portions of the rail in FIG. 11, in the position in FIG. 9.
Figure 13:
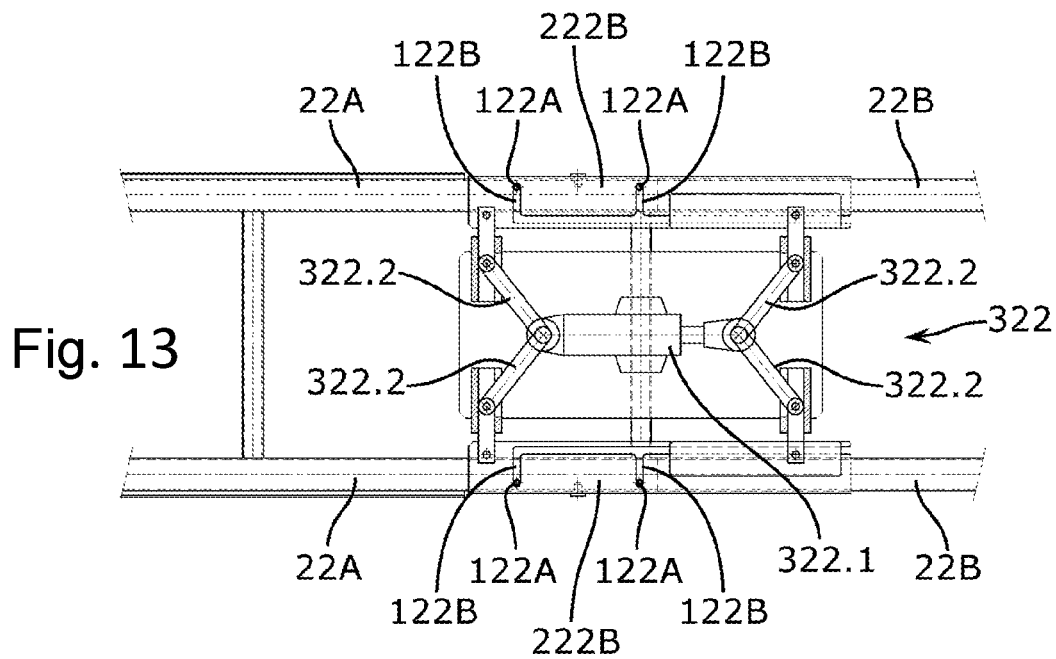
FIG. 13, a view of a mechanism for moving the rail portions in FIG. 11 from the position in FIG. 11 to the position in FIG. 12, the mechanism having been omitted from the preceding figures to simplify reading.
Figure 14:
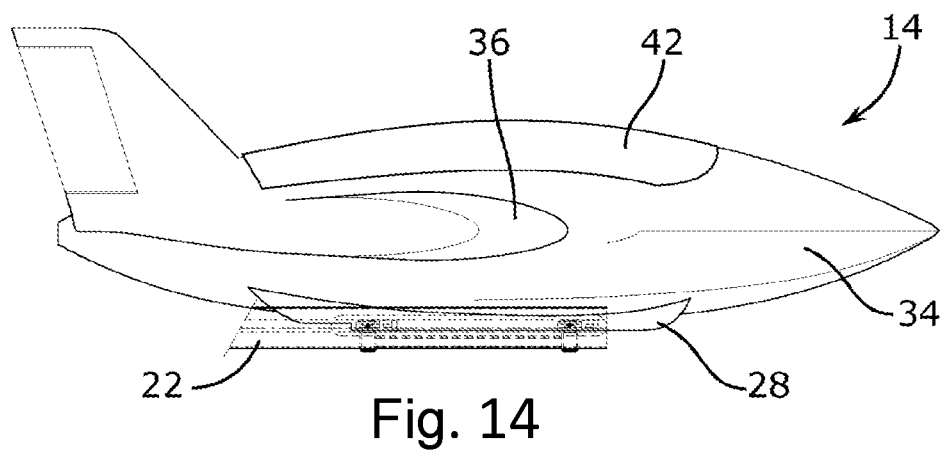
FIG. 14, a side view of the drone and a mobile assembly connecting the drone to the launch ramp at the forward end of the launch ramp in the position shown in FIG. 7.
Figure 15:
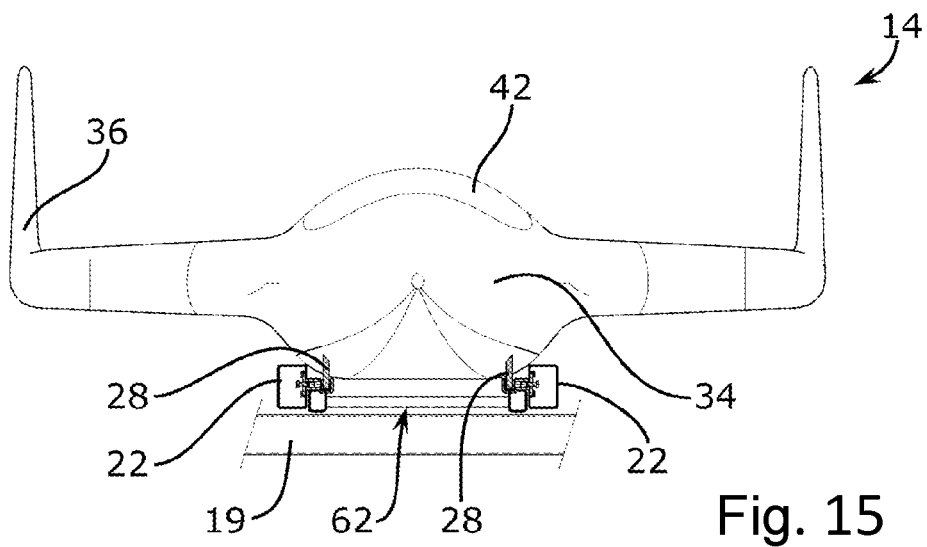
FIG. 15, a front view of the drone and of the mobile assembly linking the drone to the launch ramp.

The rear 22A and front 22B parts of each rail are placed side by side in the transport position, as shown in FIG. 8. The movement of the front part 22B of the rails is a longitudinal translation, guided by the mobile frame 21 and/or the rear part 22A of the rails, to a maximum extension position shown in FIG. 11. To align and lock the front rail part 22B with the rear rail portion 22A, the front rail portion 22B is transversely displaced, allowing locking pins 122A integral with the front end of the rear rail portion 22A to engage complementary locking slots 122B at the rear end 222B of the front rail portion 22B, as illustrated in FIGS. 9 and 12. This locking movement can be carried out by an operator, or preferably by an optional mechanism 322 illustrated in FIG. 13, comprising an actuator 322.1 linked to the rear end 222B of the front part 22B of the rails by connecting rods 322.2.

Figure 16:
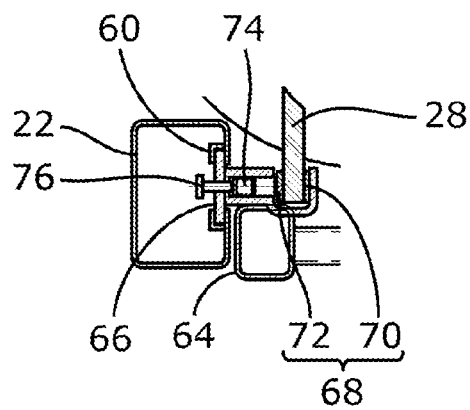
FIG. 16, a detail of FIG. 15 allowing a visualization of a locking mechanism of the drone in relation to the mobile assembly.

Each rail part 22A, 22B is a hollow section 60 within which is a runner shown in FIG. 16. In the launch position, the two parts 22A, 22B of each rail 22 are perfectly aligned, and the runners 60 of the two parts 22A, 22B of the same rail 22 are in line with each other without discontinuity. The connection between the drone 14 and the launch ramp 22 is made, in this first mode of realization, by means of a mobile assembly 62 illustrated in FIGS. 14 to 18, and voluntarily omitted on the preceding figures to simplify reading. The mobile assembly 62 comprises a frame 64 of a generally rectangular shape, two lateral skids 66 sliding in the runners formed between the two parallel rails 22 of the launch ramp 20, and four clamps 68, which clamp two legs 28 of the drone, each formed by a longitudinal rib parallel to the main axis of the fuselage and projecting under the belly of the fuselage, at a distance from the main plane of symmetry of the fuselage. Each clamp 68 has a fixed jaw 70 and a movable jaw 72 biased toward a clamping position by a return spring 74, and integral with a retracting finger 76.

Figure 17:
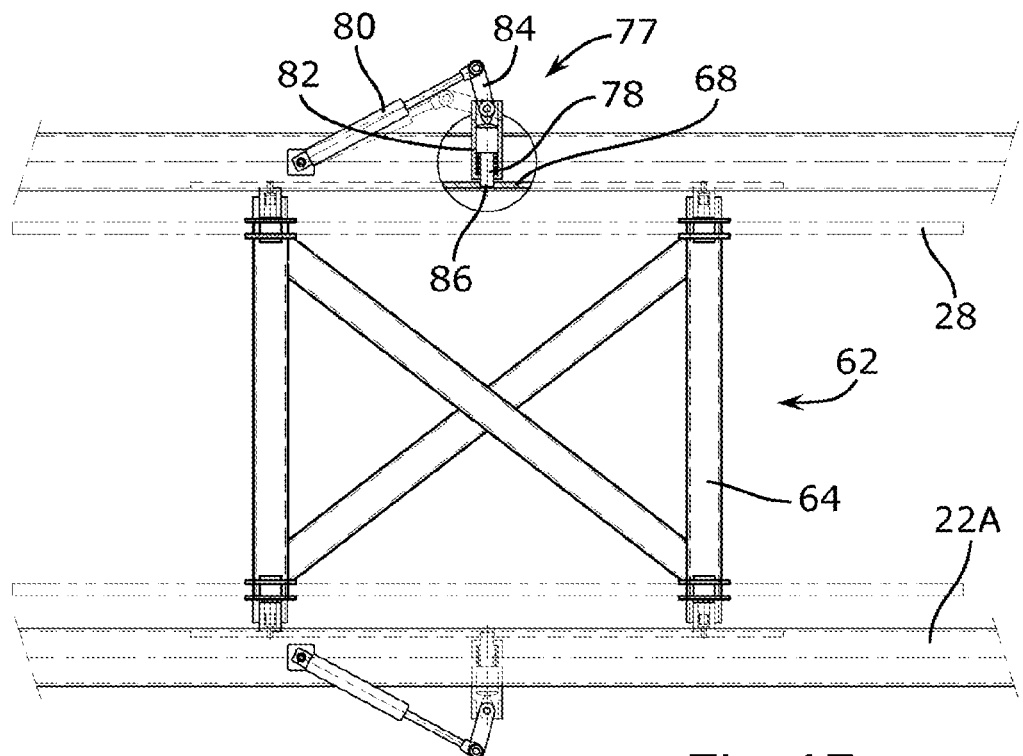
FIG. 17, a view from below of the mobile assembly and a mechanism for locking the mobile assembly to the launch ramp in the starting position of FIGS. 5 and 6.
Figure 18:
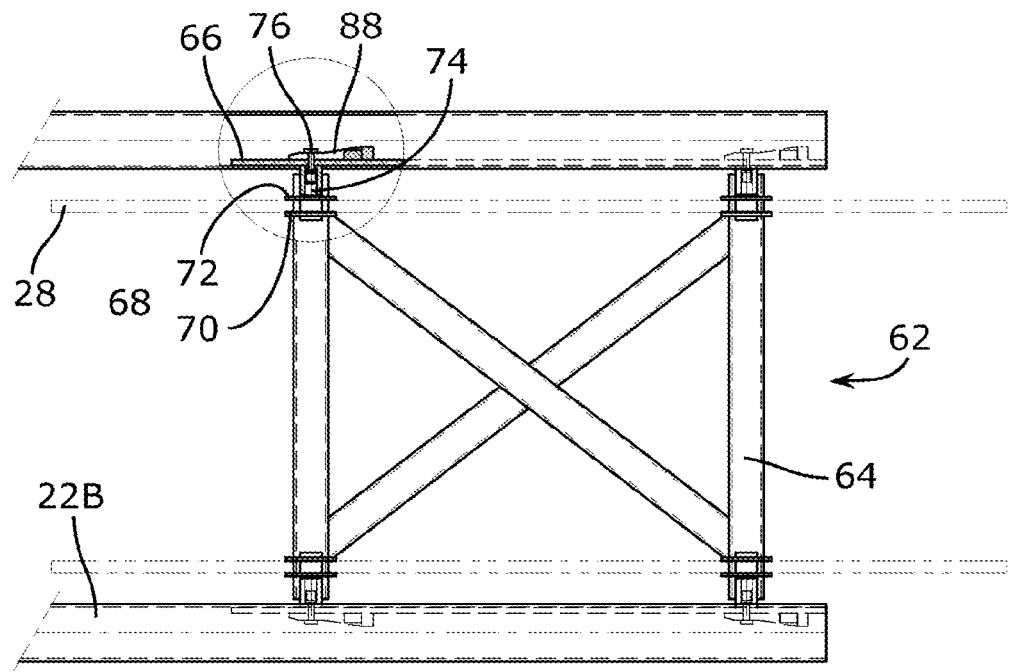
FIG. 18, a bottom view of the mobile assembly at a forward end of the launch ramp, and a release mechanism for releasing the locking mechanism between the mobile assembly and the drone in the position in FIG. 7.

The mobile assembly 62 is free to translate relative to the launch ramp 20 as the skids 66 slide in the runners 60. However, locking mechanisms are provided in two predefined positions, namely in the transport position in FIG. 1, and in the armed position in FIGS. 5 and 6, set back from the transport position towards the rear of the launch ramp 20. FIG. 17 shows the locking mechanism 77 for locking in the transport position, which has a locking bolt 78 for each rail 22 controlled by an actuator 80. For example, the locking bolt 78 can be guided in transverse translation, and returned to an unlocking position by a return spring 82, the actuator 80 being here an actuator connected to the locking bolt 78 by a lever 84. The locking bolt 78 in the locked position is housed in a bore constituting a strike plate 86 formed in the corresponding skid 66 of the mobile assembly 62. The same locking mechanism is provided for the armed position in FIGS. 5 and 6.

In the transport position in FIG. 1, and the launch phases illustrated in FIGS. 5 and 6, until reaching the position in FIG. 7, the clamps 68 are closed, ensuring the attachment of the drone 14 to the mobile assembly 62. Upon reaching the position in FIG. 7, the heads of the retracting fingers 76 engage cams 88 at the front end of the front rail portions 22B and shown in FIG. 18, so that the movable jaws 72 open, releasing the drone 14.

Indeed, the drone 14 is jet-powered, comprising one or more engines 30 giving it significant thrust, for example one or two engines each delivering thrust greater than 400 Newtons, preferably greater than 600 N. If more than one engine is provided, the power of each is preferably sufficient to allow for flight at less than full power. The motor vehicle 12 is provided with a deflector 32 adapted, in an operative position illustrated in FIGS. 5 to 7, to deflect a jet of air expelled by the jet engine(s) 30 of the drone 14, preferably upwardly. Preferably, the deflector 32 is movable between the functional position in FIGS. 5 to 7 and the transport position shown in FIG. 1, to improve the movement of the motor vehicle 12 in the air. If necessary, the deployment of the deflector 32 and that of the wheelset 26 can be simultaneous and carried out by the same actuator 126.

The drone 14 has a fuselage 34 and a wing 36, the wing preferably with a wingspan greater than 2 meters, and preferably greater than 2.5 meters, so that the wingspan is potentially greater than the track width of the vehicle 12. In a variant not shown, the wing has a variable geometry, to be folded in transport position to minimize the overall width of the assembly, and deployed for launch.

If necessary, it may be possible to equip the launch ramp 20 with a catapult 90 illustrated in FIGS. 8 to 10. Such a catapult 90 includes an actuator 92 that may include an energy accumulator capable of impulsively releasing previously accumulated energy to accelerate the drone 14 from the armed position in FIG. 5 to the release position in FIG. 7. The energy accumulator is preferably an elastic potential energy accumulator (a spring mechanism) or a chemical energy accumulator (a pyrotechnic device), or even a pneumatic energy accumulator. Preferably, the actuator 92 acts on a translationally guided transmission member 94 to transmit the kinetic energy released by the energy accumulator 92 to the drone 14. In the figures, the actuator 92 is a pyrotechnic device, and the transmission member 94 is constituted by a piston linked to a rod 94B itself linked to a head 94C, bearing against a rear shoulder 28C (visible in FIGS. 4 and 7) of the pads 28. It is also possible to consider assisting the launch with a rocket, from which the drone 14 separates after takeoff.

To launch the drone 14 from the transport position in FIG. 1, the undercarriage 26 and deflector 32 are first deployed to the position in FIG. 4, and then the launch ramp 20 is pivoted to the position in FIG. 5, releasing the locking mechanism 77 that held the mobile assembly 62 and the drone 14 relative to the launch ramp 20 in the transport position. The drone, driven by its weight, moves backwards on the launch ramp 20 until it reaches the position illustrated in FIG. 5 resting against the head 94C of the catapult 90. The locking mechanism 77 corresponding to this position locks the mobile assembly 62 and the drone in the armed position. The front portion 22B of the rails 22 of the launch ramp 20 is deployed to the position shown in FIG. 6. The deployment phases of FIGS. 4, 5 and 6 can be carried out while the vehicle is stationary, if necessary manually, or automatically, and if necessary while the vehicle 12 is moving. The order of operations can also vary: in particular, the deployment of the front part 22B of the rails 22 can be carried out while the launch ramp 20 is still horizontal.

Ultimately, after the deployment of the front part 22B of the rails 22, the motor vehicle is brought to a speed exceeding a predetermined threshold with respect to the surrounding air mass, to proceed with the actual launch of the drone 14. The engines 30 of the drone 14 are powered at low power or at least at a power higher than a predetermined threshold depending on the wind and loading conditions. Finally, the actuator 80, which is preferably an electromagnetic actuator, releases the locking mechanism 77 blocking the mobile assembly 62, while simultaneously the energy accumulator 92 of the catapult 90 is triggered, so that the drone, driven by the catapult 90 and the reactors 30, advances on the launch ramp 20, still linked to the mobile assembly 62. When reaching the front end of the launch ramp, the cams 88 open the clamps 68 which release the drone which takes off. If necessary, the undercarriage 26 contributes to the stability of the motor vehicle 12 during the launch, in particular by taking up the recoil forces of the catapult 90.

The catapult 90 is optional if the dimensioning of the engines 30 is sufficient to ensure the takeoff. If necessary, the catapult 90 may allow the drone 14 to be launched when the motor vehicle 12 has not reached a sufficient speed to allow takeoff using only the engines 30, or may allow the duration of the power supply to the engines 30 to be limited to full power, thus increasing the range of action. If the energy stored by the catapult 90 is sufficient, the launch can also be initiated while the motor vehicle 12 is stationary.

Figure 19:
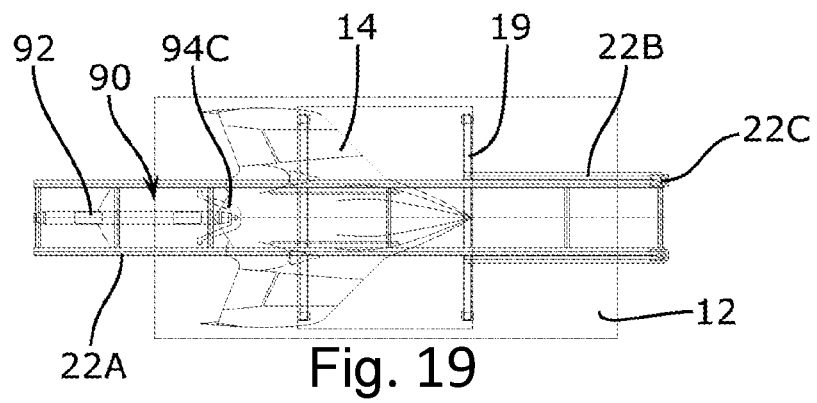
FIG. 19, a bottom view of the launch ramp and the drone in the position in FIG. 4, according to a variant constituting a second mode of realization of the invention.
Figure 20:
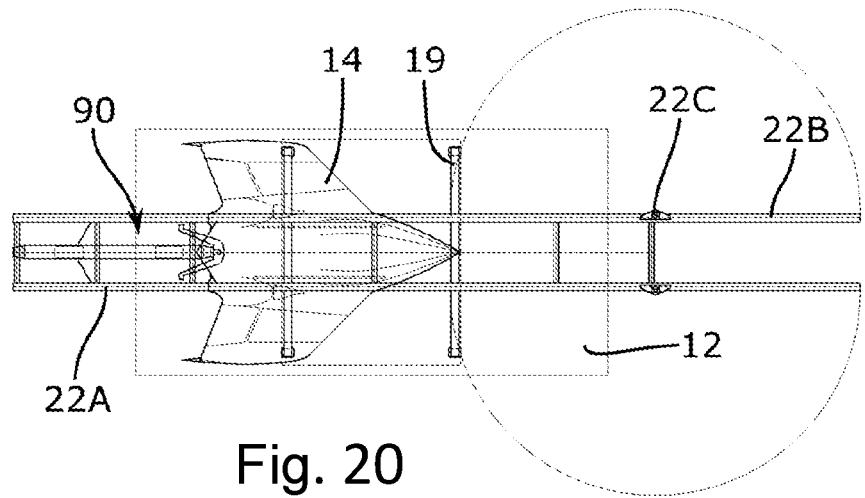
FIG. 20, a bottom view of the launch ramp and the drone according to the second embodiment of the invention, in the position in FIG. 5.

According to the variant of the FIGS. 19 and 20, the front part 22B of the rails 22 of the launch ramp 20 is connected to the rear part 22A by a joint 22C, which allows the deployment of the front part 22B by pivoting from the folded position illustrated in FIG. 19 to the deployed position in FIG. 20. This deployment can advantageously be carried out while the launch ramp 20 is still horizontal. It can of course be motorized.

Figure 21:
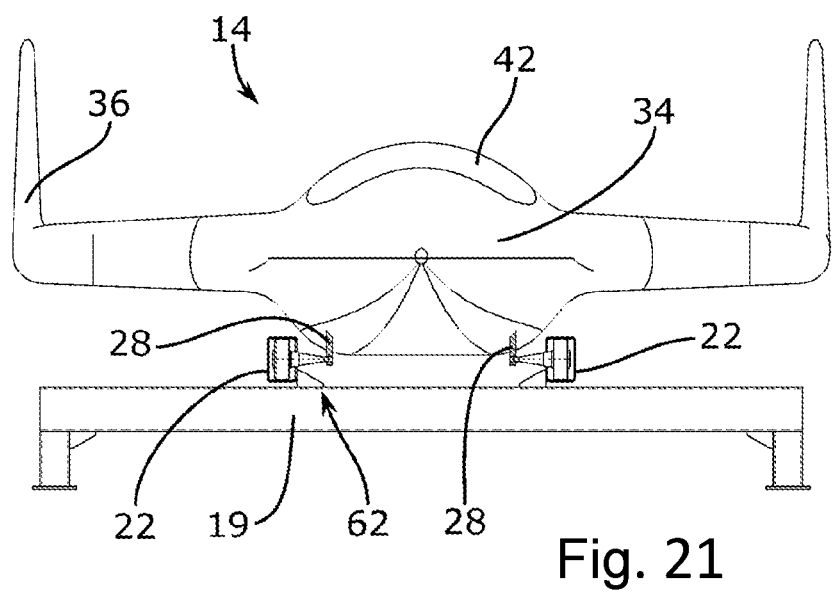
FIG. 21, a front view of the drone and of a mobile assembly linking the drone and the launch ramp, according to a variant constituting a third use of the invention.
Figure 22:
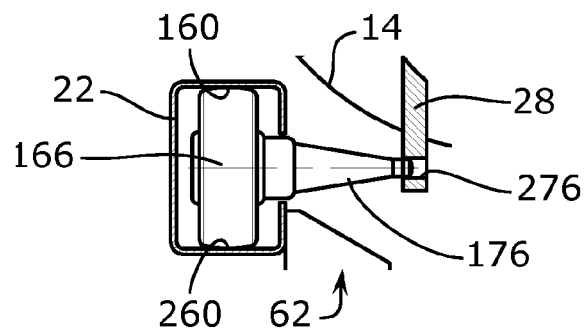
FIG. 22, a detail of FIG. 21 allowing a visualization of a locking mechanism of the drone in relation to the mobile assembly.
Figure 23:
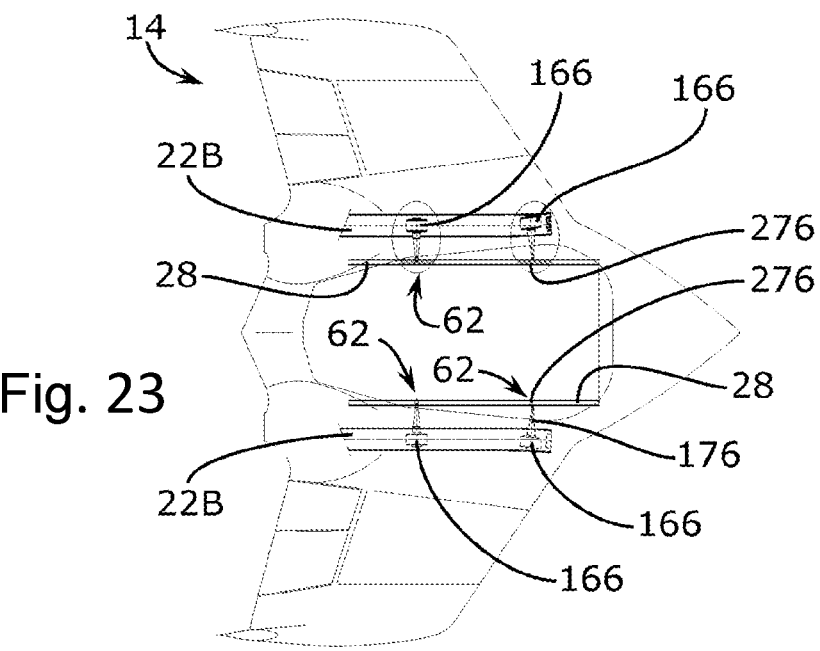
FIG. 23, a bottom view of the mobile assembly in FIG. 21 at a forward end of the launch ramp, and a release mechanism for releasing the locking mechanism between the mobile assembly and the drone in the position in FIG. 7.

According to the variant of realization of FIGS. 21 to 23, the mobile assembly 62 comprises four independent rollers 166, which come to roll, according to the conditions of bearing capacity during the launching phase, alternately on upper tracks 160 or lower tracks 260 formed between the rails 22. Each roller 166 pivots on an axis that forms a finger 176, a free end of which engages a bore 276 in a corresponding foot 28 of the drone 14, to connect the drone 14 to the roller 166.

At the front end of the front portions 22B of the rails 22, a slight deflection of the running tracks 160, 260 clears the fingers 176 and releases the drone 14 for flight, as shown in FIG. 23.

Figure 24:
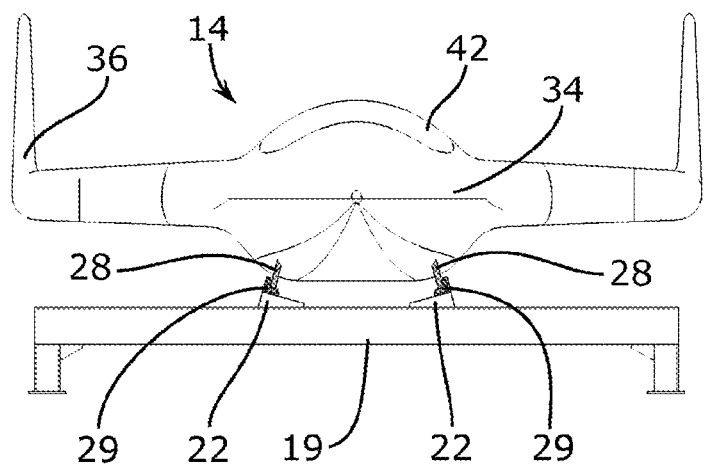
FIG. 24, a front view of the drone and of a connection between the drone and the launch ramp according to a variant constituting a fourth mode of implementation of the invention.

According to the embodiment shown in FIG. 24, the feet 28 of the drone 14 form skids that slide in runners 29 on the rails 22 of the launch ramp 20, the runners 29 being oriented so as to form together or separately a connection leaving the drone 14 only one degree of translational freedom with respect to the launch ramp 20. Advantageously, the runners 29 can be equipped with a friction-limiting covering or with rollers (not shown) on which the skids 28 roll. The drone 14 separates from the launch ramp 20 at its end when the skids 28 are released from the runners 29.

Figure 25:
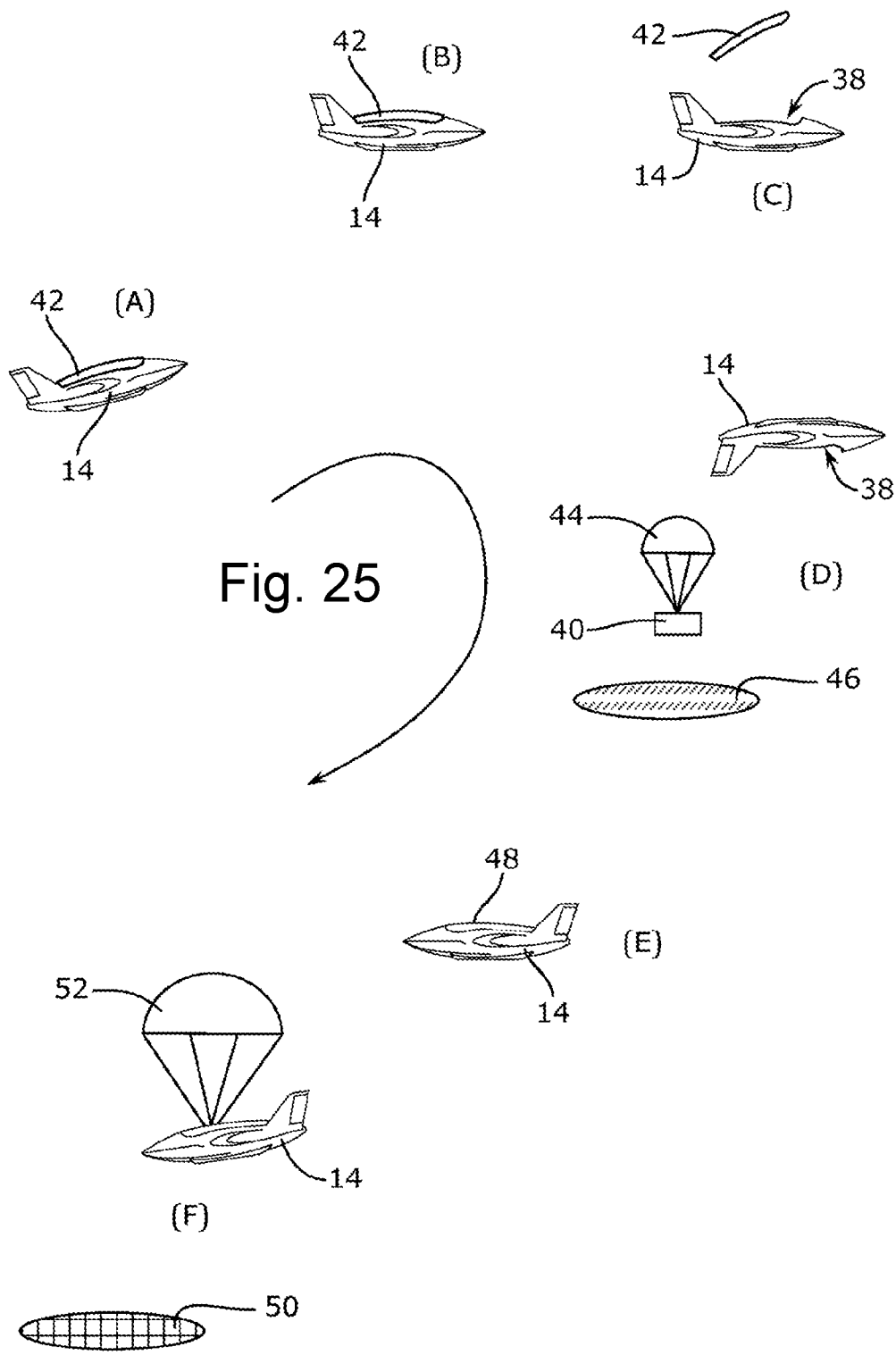
FIG. 25, a diagram of the different phases of a transport and release mission for a load by means of the assembly according to FIGS. 1 to 4, after the launch of the drone according to the launching phases in FIGS. 4 to 7.

The fuselage 34 of the drone 14 has a cavity for carrying 38 a load 40, which is preferably a load intended to be dropped. The transport cavity 38 is preferably open on the back of the fuselage, i.e., on a side of the fuselage opposite the ground at least in the takeoff (FIG. 25, A) and flight (FIG. 25, B) phases. The transport cavity 38 can be closed by a cover 42 that can be ejected or jettisoned, to optimize the thinness of the fuselage 34. To minimize the unladen weight and to limit the risks of failure, a simplified fuselage structure, not comprising an articulated door to release the load 40, has been voluntarily chosen. Therefore, to assure the airdrop of the load 40 in flight, an ejection of the cover 42 is foreseen (FIG. 25, C), followed by the turning of the drone 14 on its back and the release of the load 40 (FIG. 25, D). The airdrop of the load 40 may be accompanied by the deployment of the parachute 44 to slow down the load 40, allowing it to reach the target zone 46 without any problems. If necessary, the drone can be equipped with a shutting device 48, for example an inflatable bag or a rolling shutter, which is deployed so as to fill the cavity, or at least to close the opening, and to reconstitute continuity with the walls of the fuselage during the length of the flight (FIG. 25, E), after release, towards a recovery area 50 of the drone.

Indeed, the drone 14 has no landing gear, which contributes to its low drag. To assure its landing, the drone 14 is equipped with a recovery parachute 52 which is able to deploy upon shutdown of the engines 30 upon reaching the recovery area 50 (FIG. 25, F).

A cycle of how the drone 14 is used can thus be broken down as follows:
- a launch (FIGS. 5 to 7) and takeoff (FIG. 25, A) phase, from the motor vehicle 12 running on a launch track above a given speed threshold with respect to a surrounding air mass, during which phase the drone 14 is propelled by its jet engine(s) 30, if necessary assisted by a catapult, and guided by
- the launch ramp 20 from a starting position in a launch direction towards the front of the motor vehicle 12,
- a flight phase (FIG. 25, B) propelled by the jet engines 30 to a drop zone 46,
- if necessary, the ejection or drop of the cover 42 (FIG. 25, C),
- then, the drone 14 is turned on its back and the load 40 is released due to gravity (FIG. 25, D) with, if necessary, the deployment of a parachute for slowing down 44 the load, implemented automatically or with a delay,
- turning the drone 14 on its belly (FIG. 25, E) for a flight phase of the drone, with a possible shutting of the cavity 38 through a shutting device 48 up to a recovery zone,
- stopping or significantly slowing down the jet engines 30 and deploying the recovery parachute 52, to land the drone on its belly, without a landing gear, in a recovery area 50 (FIG. 25, F).

Alternatively, the launch phase can take place at standstill, the initial kinetic energy being obtained by combining the jet engines 30 and the catapult 90, if the latter is sufficiently powerful.

Alternatively, the transport cavity 38 is open not on the back of the fuselage, but on the belly, and closed by a cover 40 which is positioned between the skids 28. This variant limits the width of the opening 38, but avoids the turning maneuver for the airdrop.

The launch and takeoff phases of the drone can be controlled from the motor vehicle 12, by an operator with a man-machine control interface, connected by wired or wireless connection to various sensors on the motor vehicle 12 (in particular one or more of the following sensors: motor vehicle speed sensor 12, speed and direction sensor of the apparent wind, launch ramp position sensors 20) and on the drone 14, and to actuators on the locking mechanism 77 and the drone 14 in order to drive them. It can also be controlled remotely.

FIGS. 26 through 38 illustrate various embodiments of a pneumatic energy accumulator actuator 92 that can be integrated with the catapult 90 on the launch ramp 20 shown in FIGS. 8 through 10. These embodiments have in common a transmission unit 94 constituted by a piston 94A linked to a rod 94B intended to be connected to the drone 14, for example by the intermediary of the head 94C, illustrated on FIGS. 8 to 10, coming to bear against a rear shoulder 28C (visible in FIGS. 4 and 7) of the skids 28. The piston 94A slides concealed in a cylindrical body 921 of the actuator, which delimits a variable volume chamber 922 and forms with the piston 94 and the rod 94B a pneumatic cylinder.

Figure 26:
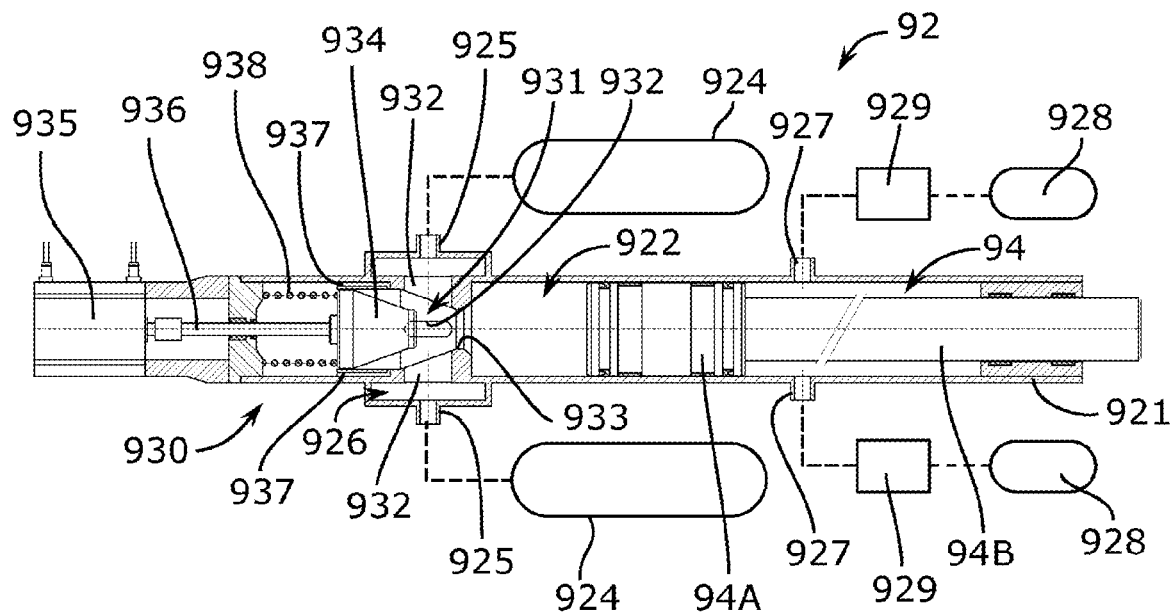
FIG. 26, an axial sectional view of a pneumatic energy storage actuator, integrated into a catapult for launching the mobile assembly and the drone on the launch ramp during the drone launch phase illustrated in FIG. 7, in a first position of modulation of a catapulting force.
Figure 27:
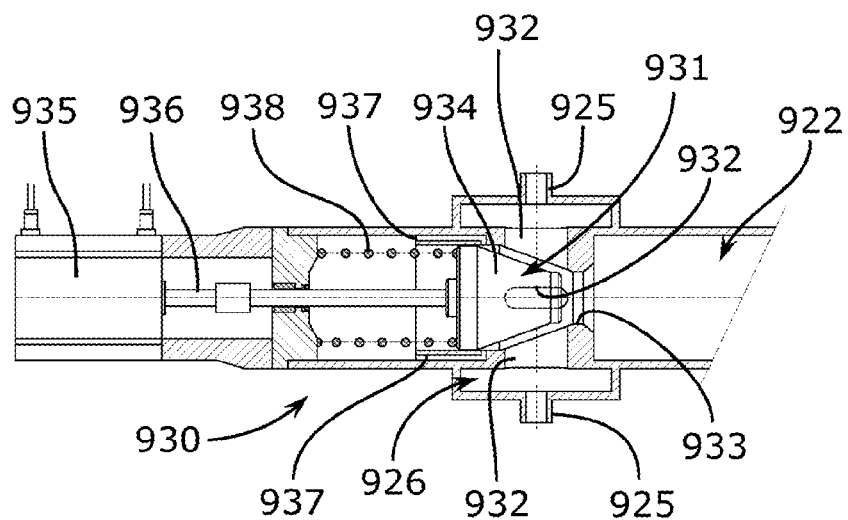
FIG. 27, an axial sectional view of the actuator in FIG. 26, in a second modulation position.

According to a first embodiment illustrated in FIGS. 26 and 27, the variable volume chamber 922 communicates with one or more pressurized pneumatic accumulators 924 via one or more supply lines 925, an optional balancing chamber 926, and a modulating valve 930. The modulating valve 930 includes a pilot chamber 931 that communicates with the balancing chamber 926 or supply lines 925 through one or more flow ports 932 and with the variable volume chamber 922 through a supply port 933. A movable modulator 934 is positioned in the pilot chamber 931 and driven by a control actuator 935 so as to be movable between a maximum opening position shown in FIG. 26 and a minimum opening position, shown in FIG. 27. The control actuator 935 can be pneumatic, hydraulic or electric.

In this embodiment, the movable modulator 934 is a modulator spool that can be moved in translation between the minimum and maximum opening positions, for example along an axis coinciding with the translation axis of the piston 94A. However, other orientations of the translation axis of the modulating spool 934 with respect to the translation axis of the piston 94A can be considered. The control actuator 935 is linear and coaxial with the translation axis of the modulator spool 934, and connected to it by a rod 936.

The movable modulator 934, in its minimum opening position, constitutes a significant pressure drop opposing the flow of compressed gas from the pneumatic accumulators 924 to the variable volume chamber 922. As it moves away from the minimum opening position towards the maximum opening position, the movable modulator 934 retracts and the pressure drop it generates decreases according to a law that may or may not be linear depending on the distance covered.

It can be seen that the mobile modulator 934 here is frustoconical in shape corresponding to the frustoconical shape of the part of the control chamber 931 into which the passage orifices 932 open. If applicable, the shape of the movable modulator 934 or the shape of the passage openings 932 may be selected so that a linear change in the position of the movable modulator 934 results in a linear or non-linear change in the pressure drop generated by the movable modulator 934.

Although passages 937 are provided between the part of the pilot chamber 931 into which the passage ports 932 and the supply port 933 open and the part of the pilot chamber 931 between the movable modulator 934 and the control actuator 935, the pressurized gas in the pilot chamber 931 induces a differential force on the movable modulator 934 pushing the movable modulator towards the 934 maximum open position, a force which is an increasing function of the prevailing pressure in the pilot chamber 931. Preferably, a balancing spring 938 biases the movable modulator 935 toward the minimum open position and at least partially balances this force.

Preferably, the control actuator 935 allows the movable modulator 934 to stably assume any desired intermediate position between the minimum opening position of the maximum opening position, so as to generate a variable pressure drop between the flow ports 932 and the variable volume chamber 922. If applicable, the control actuator 935 may comprise an irreversible mechanism, in the sense that no holding energy is required to maintain the control actuator 935 and the movable modulator 934 in any position between the minimum opening position of the maximum opening position, regardless of the forces applied to the movable modulator 934.

The aim is to obtain in the variable volume chamber 922 a pressure and a flow that follow a predetermined law as a function of the course of the piston 94A from the armed position in FIG. 5 to the release position in FIG. 7, in order to transfer to the drone 14 the kinetic energy necessary for takeoff, without exceeding a predetermined threshold of instantaneous acceleration the structure of the drone 14 and the on-board equipment can bear.

For this purpose, the control actuator can be a proportional control actuator, implementing a control loop with respect to a set-point signal which can be, for example, a piston position, speed or acceleration signal, or a moveable modulator position, speed or acceleration signal.

Alternatively, the control actuator 935 may be set to a constant rhythm between two end positions during the launch of the drone 14, with the shape of the flow ports 932 and the movable modulator 934 imposing the desired flow law.

Optionally, an auxiliary supply port 927 of the variable volume chamber 922 connected to an auxiliary pressure source 928 via a solenoid valve 929 is foreseeable, the latter being closed as long as the piston 94A is upstream of the auxiliary supply port 927 and opening as soon as the piston 94A passes downstream of the auxiliary supply port 927 so as to increase the flow entering the variable volume chamber 922 in the last part of its course.

When the drone 14 is in the armed position in FIGS. 5 and 6, locked by the corresponding locking mechanism 77, and an operator gives a command to launch the drone, the control actuator 935 positions the movable modulator 934 in a desired initial position, while the locking mechanism 77 is kept locked. The volume of the variable volume chamber is minimal and the pressure inside is equal to the pressure of the pneumatic accumulators 924.

Then, the actuator 80 causes the locking bolt 78 to retract, releasing the mobile assembly 62. The pressure in the variable volume chamber 922 pushes back the piston 94A and a stream of pressurized gas is supplied to the variable volume chamber 922 with a flow rate controlled by the movable modulator 934 whose position is continuously adapted so that the acceleration of the mobile assembly 62 remains below a predetermined threshold. The launch phase lasts less than a second, and the control actuator 935 is scaled to have an appropriate response time, allowing for flow modulation to regulate the acceleration of the drone 14 in real time.

Figure 28:
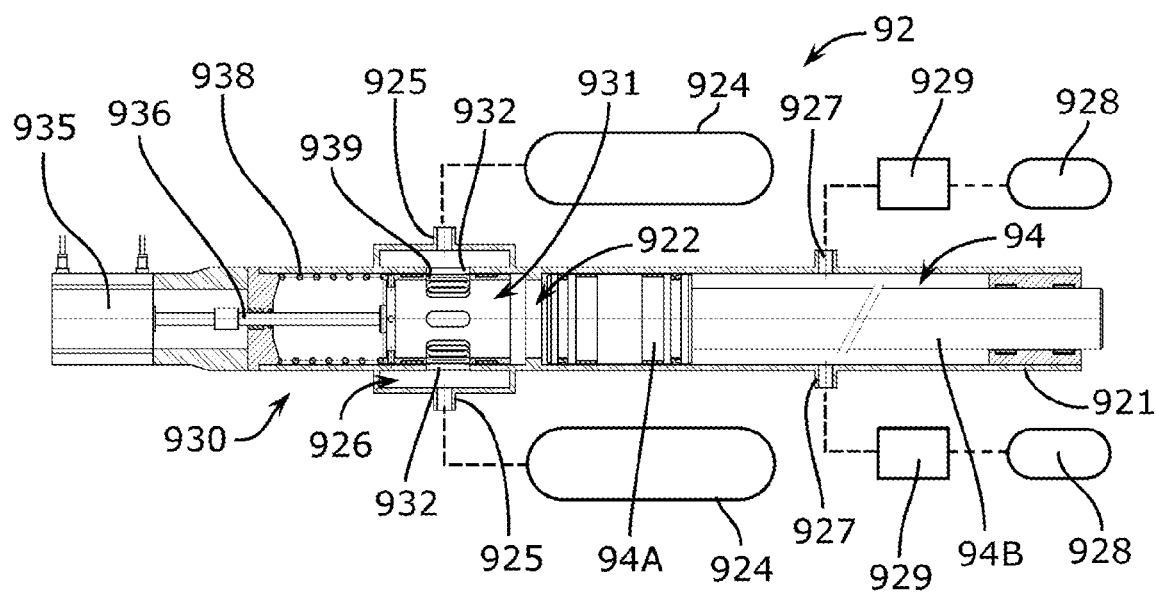
FIG. 28, an axial cross-sectional view of a pneumatic energy storage actuator constituting an alternative to the actuator in FIG. 26, in a first modulation position.
Figure 29:
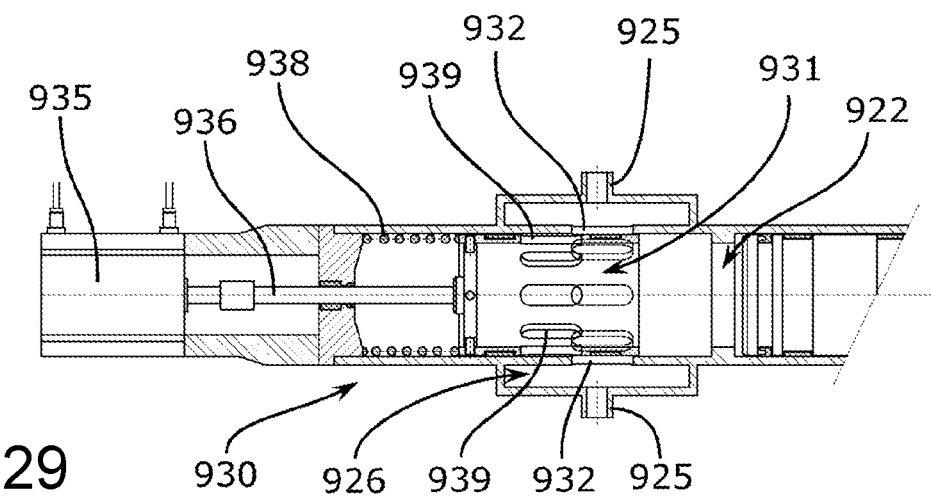
FIG. 29, an axial sectional view of the actuator in FIG. 28, in a second modulation position.

The embodiment shown in FIGS. 28 and 29 differs from the previous one in the shape of the mobile modulator 934, which is here an axially sliding spool in the control chamber 931 and equipped with through bores 939. The pilot chamber 931 is largely open to the variable volume chamber 922 and can be considered part of it. The spool 934 is attached to a rod 936 of a control linear actuator 935 that allows the position of the spool 934 to be varied between a maximum open position shown in FIG. 28, in which the through bores 939 are largely aligned with the passage ports 932, and a minimally open or even closed position shown in FIG. 29, in which the overlap between the through bores 939 and the passage ports 932 is minimal or non-existent. The shape of the through bores 939 and the passage ports 932 can be adapted to determine a linear or non-linear law of variation of the through bore cross-section as a function of the course of the spool 934.

A balancing spring 938 biases the spool 934 toward the maximum open position in FIG. 28.

Figure 30:
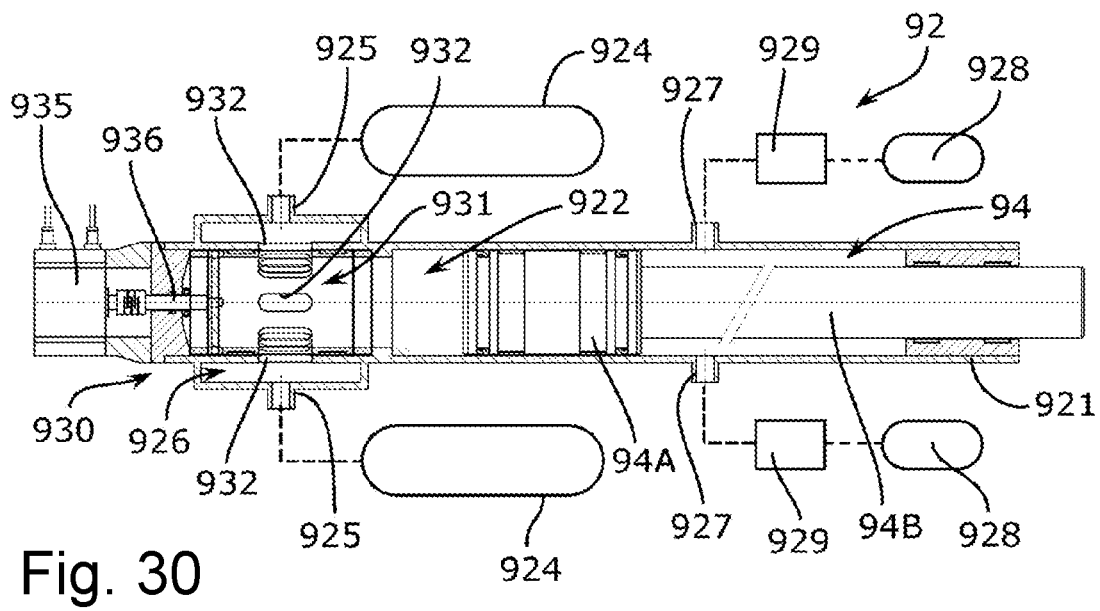
FIG. 30, an axial sectional view of a pneumatic energy storage actuator constituting an alternative to the actuators in FIGS. 26 to 29, in a first modulation position.
Figure 31:
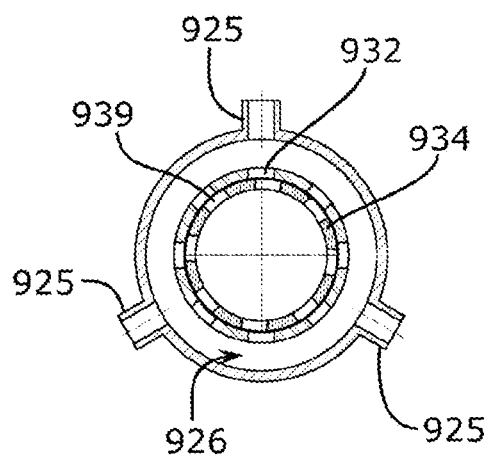
FIG. 31, a cross-sectional view of the actuator in FIG. 30, in the first modulation position.
Figure 32:
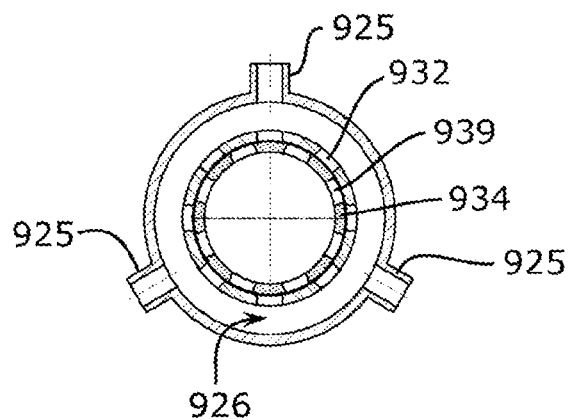
FIG. 32, a cross-sectional view of the actuator in FIG. 30, in a second modulation position.

The embodiment in FIGS. 30 to 32 differs from the preceding ones in that the movable modulator 934 is a rotary valve driven by a rotary control actuator 935, which rotates one-eighth of a revolution between a maximum open position shown in FIGS. 30 and 31 and a minimally open position shown in FIG. 32, which may optionally be a closed position.

Figure 33:
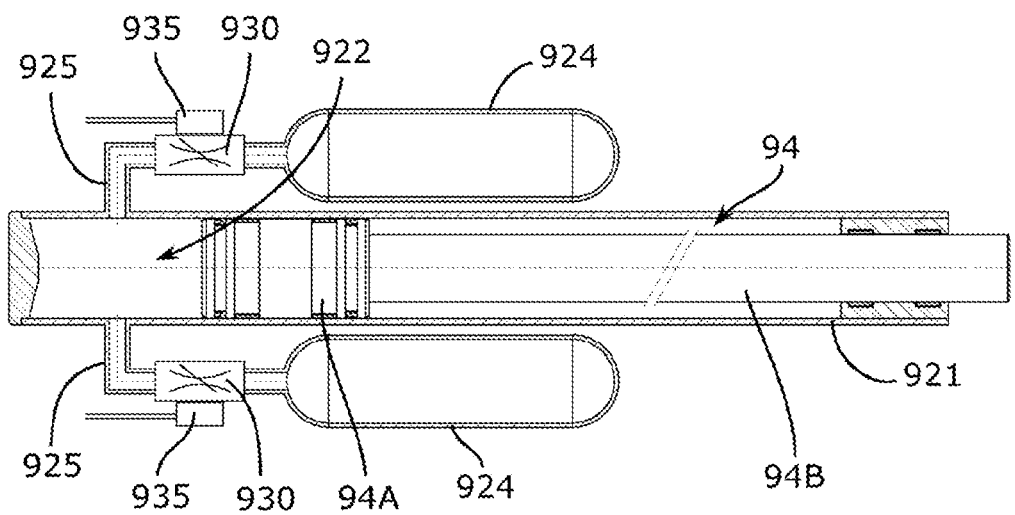
FIG. 33, an axial sectional view of a pneumatic energy storage actuator constituting an alternative to the actuators in FIGS. 26 to 32.

FIG. 33 shows a variant of the previous embodiments, in which each of the supply lines 925 opens directly into the variable volume chamber 922 and is equipped with a modulating valve 930, which may be of the type previously described or a commercial solenoid valve. It is then possible to operate the modulating valves 930 simultaneously or successively, and more generally, with two different behavior laws to optimize the compressed air flow into the variable volume chamber 922.

Figure 34:
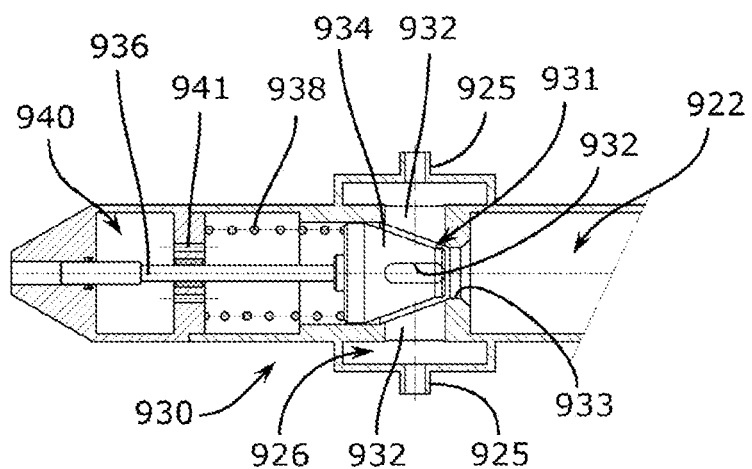
FIG. 34, an axial sectional view of a pneumatic energy storage actuator constituting an alternative to the actuators in FIGS. 26 to 33.

FIG. 34 illustrates another embodiment, in which the modulation of the flow rate into the variable volume chamber 922 is achieved passively, without a control actuator 935. For this purpose, the part of the control chamber 931 opposite the variable volume chamber 922 communicates with a modulation chamber 940 through calibrated bores 941. The calibration of the calibrated holes 941, the spring setting 938, the dimensions of the passage ports 932 and the shape of the movable modulator 934 are then chosen so that the dynamic behavior of the mobile modulator during piston expansion conforms to the desired law.

Figure 35:
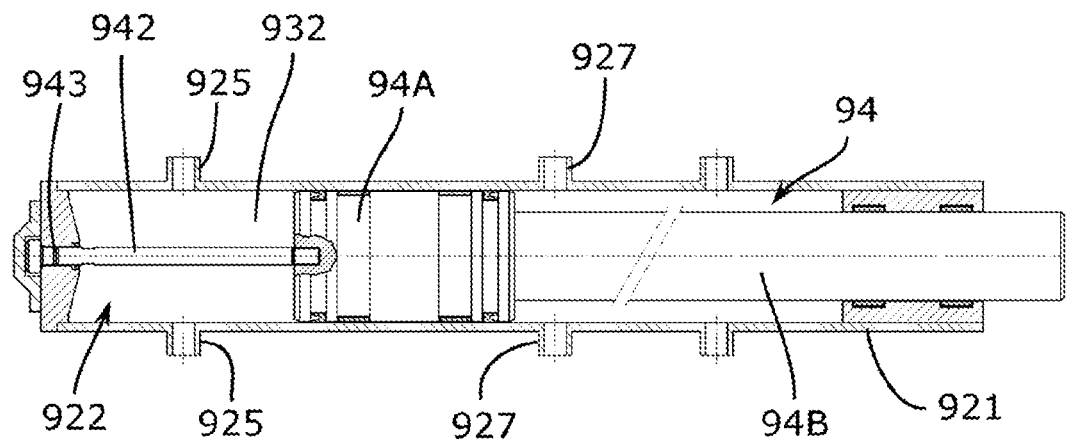
FIG. 35, an axial cross-sectional view of a pneumatic energy storage actuator with a trigger that can also be optionally implemented in the actuators in FIGS. 26 to 34, in a pre-firing position.
Figure 36:
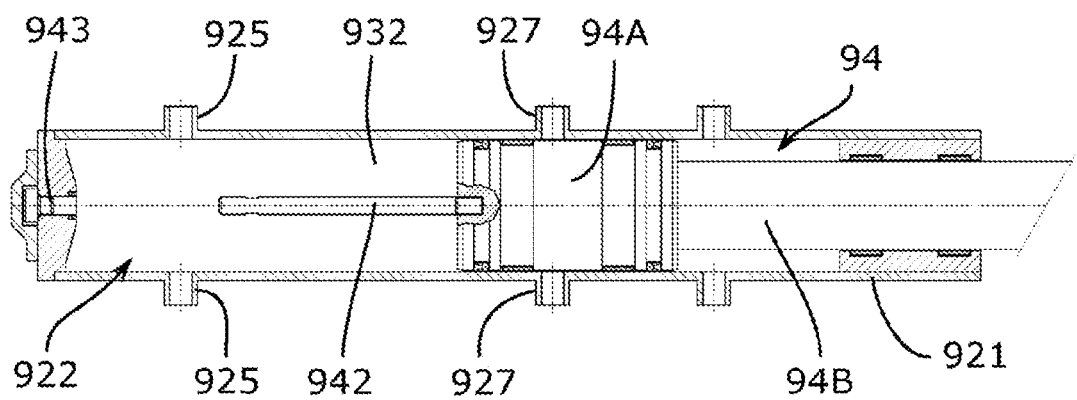
FIG. 36, an axial cross-sectional view of the actuator in FIG. 35, in a post-actuation position.

FIGS. 35 and 36 illustrate an accessory which is usable in all the preceding embodiments and which consists of a retaining rod 942 connecting the piston 94A to the cylindrical body 921, this rod comprising a breakable portion 943 calibrated in such a way as to yield when the pressure exerted on the piston 94A exceeds a predetermined threshold, as illustrated in FIG. 36.

Figure 37:
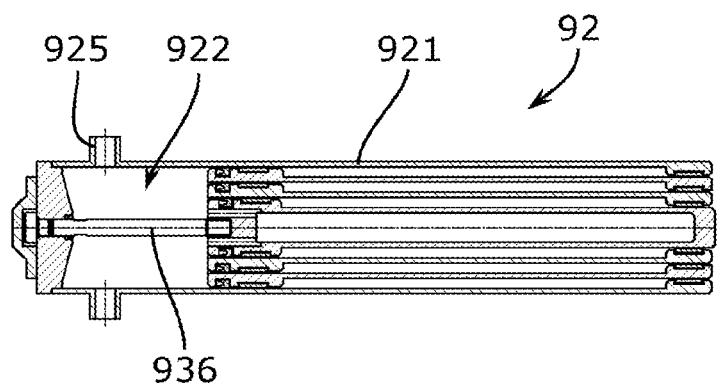
FIG. 37, an axial cross-sectional view of a telescopic actuator, showing a telescopic mechanism that can also be integrated with the actuators in FIGS. 26 to 36, in a retracted position.
Figure 38:
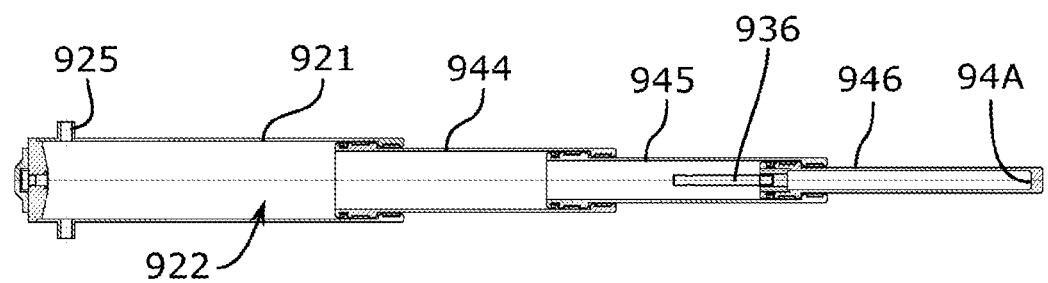
FIG. 38, an axial cross-sectional view of the telescopic actuator in FIG. 37, in a deployed position.

In FIGS. 37 and 38, an embodiment is shown in which the actuator 92 of the catapult 90 is a telescopic actuator, for increased compactness, the variable volume chamber 922 being formed by one or more coaxial nested tubes 944, 945, 946 of decreasing diameters initially positioned within a tubular, cylindrical body 921. This arrangement can be implemented in all previously described variants of the actuator 92.

Figure 39:
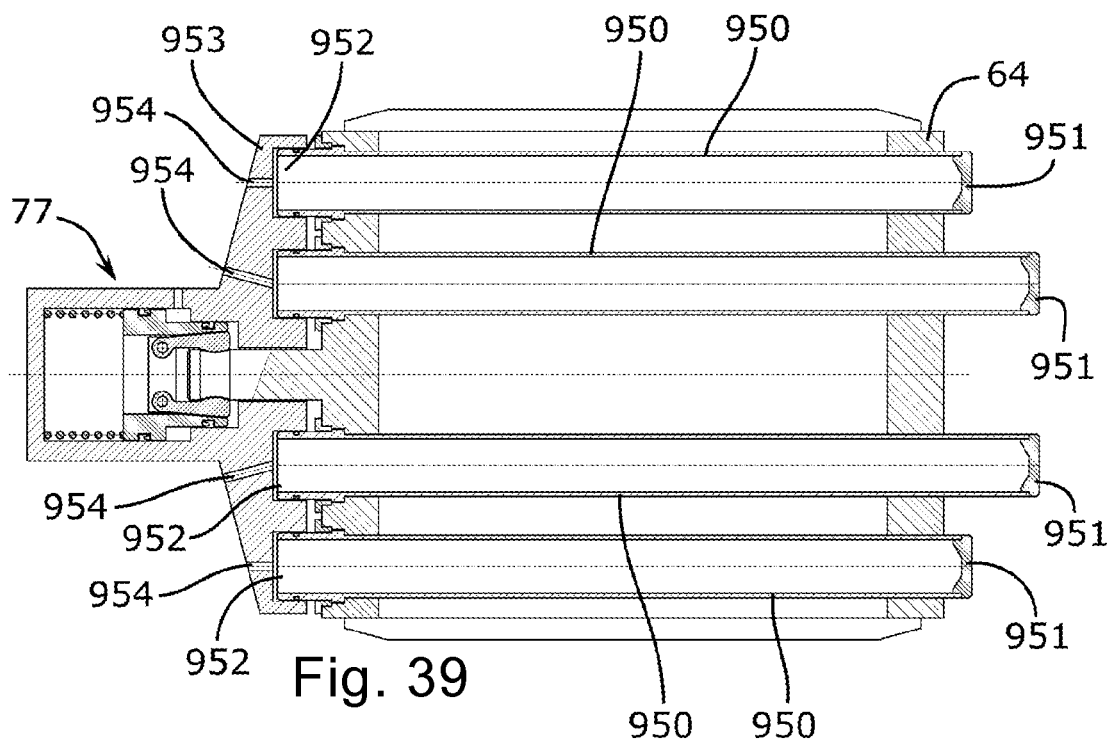
FIG. 39, an axial cross-sectional view of a pneumatic energy storage actuator as an alternative to the actuators in FIGS. 26 to 38.

FIG. 39 illustrates a catapult 90 that is integrated with the frame 64 of the mobile assembly 62 as shown in FIGS. 14 through 18. Tubes 950 with a closed bottom 951 at one end are attached to the frame, and the opposite end 952 is open and hermetically attached 953 to a holding base 64.

Filling ports 954 allow a compressible fluid, in this case pressurized air, to be injected into the tubes 950. The frame 64 is held in the armed position by a hydraulically or pneumatically operated locking mechanism 77. As soon as the locking mechanism 77 releases the frames 64, the pressure exerted on the bottoms 951 of the tubes 950 projects the frames 64 and the mobile assembly 62 carrying the drone 14 onto the launch ramp 22. The tubes 950 may have different capacities and diameters from each other, and the open ends 952 may also have different opening cross-sections from each other.

In all embodiments of the actuator 92, a shock absorber is provided at the end of the launch path, which may incorporate an elastomeric block, a gas damper, a spring, or any other suitable device.

Of course, the examples shown in the figures and discussed above are only illustrative and non-restrictive. It is explicitly foreseen that the various illustrated embodiments can be combined with each other to provide further embodiments.

The invention claimed is:
1. An assembly comprising:
   a motorized launch vehicle; and
   a drone, the drone having a fuselage and a wing, the motorized launch vehicle being capable of rolling on a launch track to exceed a given speed threshold with respect to a surrounding air mass, the motorized launch vehicle being provided with a launch ramp cooperating with the drone in order, in a launch position, to guide the drone in translation from a starting position in a launch direction towards the front of the launch vehicle while the motorized launch vehicle rolls on the launch track and exceeds the given speed threshold with respect to the surrounding air mass, wherein the drone comprises one or more jet engines and does not comprise a landing gear, wherein the motorized launch vehicle is provided with a deflector capable, in an operational position, of deflecting a jet of air expelled by the jet engine(s) of the drone, the deflector being movable between the functional position and a transport position to reduce the drag of the launching motor vehicle in the air, the deflector in the functional position deflecting the jet of air upwards, and wherein the wing having a wingspan that fulfills at least one of the following conditions:

the wingspan is greater than a lane width of the motorized launch vehicle, or the wingspan is greater than two meters.

2. The assembly of claim 1, further comprising at least one locking mechanism, movable between a locking position for fixing the drone with respect to the launch ramp in a cocked position, and an unlocking position authorizing movement of the drone with respect to the launch ramp.

3. The assembly of claim 2, wherein the locking mechanism is provided with a trigger selected from the group consisting of a mechanical trigger, an electromechanical trigger and a pyrotechnical trigger.

4. The assembly of claim 1, wherein the launch ramp is movable between the launch position and a transport position, to reduce the drag of the motorized launch vehicle in the air.

5. The assembly of claim 4, wherein the launch ramp is positioned on a roof of the launch motor vehicle, which has an inclined rear cover allowing a cantilevered rear portion of the launch ramp to lower when the launch ramp moves from the transport position to the launch position.

6. The assembly of claim 4, wherein a change from the transport position to the launch position results in an inclination of the launch ramp and/or an extension of the launch ramp.

7. The assembly of claim 1, wherein the drone is provided with skids for sliding on the launch ramp, in rails or in runners on the launch ramp.

8. The assembly of claim 1, further comprising a mobile assembly guided in translation along the launch ramp, and means for securing the drone to the mobile assembly until the drone reaches a takeoff position with respect to the launch ramp and releasing the drone from the mobile assembly when the drone reaches the takeoff position.

9. The assembly of claim 1, wherein the drone is equipped with a recovery parachute.

10. The assembly of claim 1, wherein the launch ramp is equipped with an energy accumulator capable of impulsively releasing previously accumulated energy to catapult the drone.

11. A method of transporting and dropping a load, comprising:

launching a drone carrying the load, then;

flying the drone to a drop zone, followed by;

dropping the load from the drone in flight, then;

a flight of the drone to a recovery zone, wherein for the launch, a launch vehicle carrying the drone rolls on a launch track so as to exceed a given speed threshold with respect to a surrounding air mass and the drone is guided by a launch ramp fitted to the motorized launch vehicle from a starting position in a direction of launch towards the front of the motorized launch vehicle, the drone is propelled, during the launch and at least part of the flight towards the drop zone and/or the flight to the recovery zone at least partially by one or more engines of the drone;

the drone, having reached the recovery zone, deploys a recovery parachute; and lands on the recovery area without a landing gear, wherein the drone comprises a fuselage and a wing, the wing having a wingspan that fulfills at least one of the following conditions:

the wingspan is greater than a lane width of the motorized launch vehicle, or the wingspan is greater than two meters.

12. The method of claim 11, wherein the dropping of the load comprises the drone turning onto its back, then, by gravity, a release of the load from a cavity of the drone flying on its back, then, a deployment of a parachute to slow down the load in free fall.

13. The assembly of claim 3, wherein the trigger is controlled to not trigger until a predetermined condition is met, the predetermined condition being one of the following conditions, or a combination of several of the following conditions:

the jet engine(s) of the drone deliver a thrust above a given threshold;

a force exerted by the drone on the attachment device is lower than a given threshold;

the motor vehicle has reached or exceeded the given speed threshold in relation to the surrounding air mass;

the motor vehicle has reached or exceeded a given speed threshold;

the launch ramp has a given inclination or angular area with respect to the horizontal;

the launch ramp has a given inclination or a given angular area with respect to the attitude of the motor vehicle.

14. The assembly of claim 1, wherein the fuselage comprises a transport cavity configured to carry a load.

15. The assembly of claim 14, wherein, in the launch position, the transport cavity is open on a side of the fuselage opposite the ground.

* * * * *